(12) United States Patent
Bradley et al.

(10) Patent No.: US 10,775,488 B2
(45) Date of Patent: Sep. 15, 2020

(54) CALIBRATION FOR AN AUTONOMOUS VEHICLE LIDAR MODULE

(71) Applicant: UATC, LLC, San Francisco, CA (US)

(72) Inventors: David McAllister Bradley, Pittsburgh, PA (US); Gehua Yang, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 471 days.

(21) Appl. No.: 15/679,319

(22) Filed: Aug. 17, 2017

(65) Prior Publication Data

US 2019/0056483 A1 Feb. 21, 2019

(51) Int. Cl.
| | | |
|---|---|---|
| G01S 7/497 | (2006.01) |
| G01S 17/42 | (2006.01) |
| G01S 7/481 | (2006.01) |
| G01S 17/931 | (2020.01) |

(52) U.S. Cl.
CPC .......... *G01S 7/4972* (2013.01); *G01S 7/4815* (2013.01); *G01S 17/42* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 5,012,745 A | 5/1991 | Yamashita |
| 5,170,458 A | 12/1992 | Aoyagi |
| 5,590,604 A | 1/1997 | Lund |
| 5,598,783 A | 2/1997 | Lund |
| 6,122,040 A | 9/2000 | Arita |
| 6,434,302 B1 | 8/2002 | Fidric |
| 6,657,705 B2 | 12/2003 | Sano |
| 6,827,265 B2 | 12/2004 | Knowles |
| 6,860,350 B2 | 3/2005 | Beuhler |
| 6,956,227 B2 | 10/2005 | Miyazaki |
| 7,248,342 B1 | 7/2007 | Degnan |
| 7,650,239 B2 | 1/2010 | Samukawa |
| 7,961,301 B2 | 6/2011 | Earhart |
| 8,208,716 B2 | 6/2012 | Choi |
| 8,344,940 B2 | 1/2013 | Jeong |
| 8,767,186 B2 | 7/2014 | Lu |
| 8,797,828 B1 | 8/2014 | Lev |
| 8,899,903 B1 | 12/2014 | Saad |

(Continued)

FOREIGN PATENT DOCUMENTS

| | | |
|---|---|---|
| CN | 102494609 | 6/2012 |
| CN | 101959022 | 11/2012 |

(Continued)

OTHER PUBLICATIONS

Office Action in JP 2016-502343 dated Jan. 18, 2018.

(Continued)

*Primary Examiner* — Hovhannes Baghdasaryan
(74) *Attorney, Agent, or Firm* — Dority & Manning, P.A.

(57) ABSTRACT

A LIDAR calibration module can detect a set of return signals from a plurality of fiducial targets for a set of laser scanners of an autonomous vehicle's LIDAR module. The autonomous vehicle can rest on an inclined platform of a rotating turntable to increase range variation in the return signals. Based on the set of return signals, the LIDAR calibration system can generate a set of calibration transforms to adjust a set of intrinsic parameters of the LIDAR module.

20 Claims, 15 Drawing Sheets

(56) References Cited

U.S. PATENT DOCUMENTS

| | | | |
|---|---|---|---|
| 8,909,375 B2 | 12/2014 | Larson | |
| 8,994,581 B1 | 3/2015 | Brown | |
| 9,126,595 B2 | 9/2015 | Seo | |
| 9,201,424 B1 | 12/2015 | Ogale | |
| 9,224,053 B1 | 12/2015 | Ferguson | |
| 9,228,833 B2 | 1/2016 | Zeng | |
| 9,231,998 B2 | 1/2016 | Lu | |
| 9,247,211 B2 | 1/2016 | Zhang | |
| 9,279,670 B2* | 3/2016 | Schommer | G01S 7/40 |
| 9,328,526 B2 | 5/2016 | Shani | |
| 9,383,753 B1 | 7/2016 | Templeton | |
| 9,453,914 B2 | 9/2016 | Stettner | |
| 9,529,079 B1 | 12/2016 | Droz | |
| 9,625,582 B2 | 4/2017 | Gruver | |
| 9,637,118 B2 | 5/2017 | Yokota | |
| 9,669,827 B1 | 6/2017 | Ferguson | |
| 9,696,722 B1 | 7/2017 | Ulrich | |
| 9,719,801 B1 | 8/2017 | Ferguson | |
| 9,720,415 B2 | 8/2017 | Levinson | |
| 9,823,353 B2 | 11/2017 | Eichenholz | |
| 9,840,256 B1 | 12/2017 | Valois | |
| 9,841,495 B2 | 12/2017 | Campbell | |
| 9,841,763 B1 | 12/2017 | Valois | |
| 9,857,468 B1 | 1/2018 | Eichenholz | |
| 9,869,753 B2 | 1/2018 | Eldada | |
| 9,869,754 B1 | 1/2018 | Campbell | |
| 9,874,635 B1 | 1/2018 | Eichenholz | |
| 9,880,263 B2 | 1/2018 | Droz | |
| 9,897,687 B1 | 2/2018 | Campbell | |
| 2002/0135468 A1 | 9/2002 | Bos et al. | |
| 2004/0030474 A1 | 2/2004 | Samuel | |
| 2004/0148093 A1 | 7/2004 | Tanaka | |
| 2004/0174537 A1 | 9/2004 | Ferger | |
| 2005/0095092 A1 | 5/2005 | Segal | |
| 2005/0185846 A1 | 8/2005 | Luo | |
| 2005/0196015 A1 | 9/2005 | Luo | |
| 2005/0196035 A1 | 9/2005 | Luo | |
| 2006/0089765 A1 | 4/2006 | Pack | |
| 2006/0149134 A1 | 7/2006 | Soper | |
| 2007/0200064 A1 | 8/2007 | Remillard | |
| 2007/0212006 A1 | 9/2007 | Wysocki | |
| 2007/0219720 A1 | 9/2007 | Trepagnier | |
| 2008/0002427 A1 | 1/2008 | Kropac | |
| 2008/0039991 A1 | 2/2008 | May | |
| 2008/0161986 A1 | 7/2008 | Breed | |
| 2008/0215184 A1 | 9/2008 | Choi et al. | |
| 2009/0312906 A1 | 12/2009 | Bauer | |
| 2009/0319112 A1 | 12/2009 | Fregene | |
| 2010/0013615 A1 | 1/2010 | Hebert et al. | |
| 2010/0020306 A1 | 1/2010 | Hall | |
| 2010/0053715 A1 | 3/2010 | O'Neill | |
| 2010/0076709 A1* | 3/2010 | Hukkeri | G01S 7/4021 |
| | | | 702/94 |
| 2010/0110192 A1 | 5/2010 | Johnston | |
| 2010/0185353 A1 | 7/2010 | Barwick | |
| 2010/0194890 A1 | 8/2010 | Weller | |
| 2010/0208034 A1 | 8/2010 | Chen | |
| 2010/0208244 A1 | 8/2010 | Earhart | |
| 2011/0050855 A1 | 3/2011 | Nobis et al. | |
| 2011/0134249 A1 | 6/2011 | Wood | |
| 2011/0166757 A1 | 7/2011 | Otanez | |
| 2011/0184605 A1 | 7/2011 | Neff | |
| 2011/0241845 A1 | 10/2011 | Sullivan | |
| 2011/0245964 A1 | 10/2011 | Sullivan | |
| 2011/0301786 A1 | 12/2011 | Allis | |
| 2011/0317993 A1 | 12/2011 | Weissler | |
| 2012/0008129 A1 | 1/2012 | Lu | |
| 2012/0033196 A1 | 2/2012 | Vanek | |
| 2012/0154785 A1 | 6/2012 | Gilliland | |
| 2012/0239238 A1 | 9/2012 | Harvey | |
| 2013/0078063 A1 | 3/2013 | Shanil | |
| 2013/0166105 A1 | 6/2013 | Wastel | |
| 2013/0190963 A1 | 7/2013 | Kuss | |
| 2013/0226431 A1 | 8/2013 | Lu | |
| 2013/0317649 A1 | 11/2013 | Larson | |
| 2014/0041966 A1 | 2/2014 | Healy | |
| 2014/0136414 A1 | 5/2014 | Abhyanker | |
| 2014/0168631 A1 | 6/2014 | Haslim | |
| 2014/0176933 A1 | 6/2014 | Haslim | |
| 2014/0277691 A1 | 9/2014 | Jacobus | |
| 2014/0286744 A1 | 9/2014 | Shani | |
| 2015/0202939 A1 | 7/2015 | Stettner | |
| 2015/0293225 A1 | 10/2015 | Riley | |
| 2015/0334269 A1 | 11/2015 | Yokota | |
| 2016/0003946 A1 | 1/2016 | Gilliland | |
| 2016/0129917 A1 | 5/2016 | Gariepy | |
| 2016/0223671 A1 | 8/2016 | Thayer | |
| 2016/0227193 A1 | 8/2016 | Osterwood | |
| 2016/0231746 A1 | 8/2016 | Hazelton et al. | |
| 2016/0282453 A1* | 9/2016 | Pennecot | G01S 7/4972 |
| 2016/0291134 A1 | 10/2016 | Droz | |
| 2016/0318415 A1 | 11/2016 | Salasoo | |
| 2016/0349746 A1 | 12/2016 | Grau | |
| 2017/0096138 A1 | 4/2017 | Reiff | |
| 2017/0168146 A1 | 6/2017 | Boehmke | |
| 2017/0184399 A1 | 6/2017 | Thayer | |
| 2017/0226765 A1 | 8/2017 | Wastel | |
| 2017/0255199 A1 | 9/2017 | Boehmke | |
| 2017/0343654 A1* | 11/2017 | Valois | G01S 7/497 |
| 2017/0357260 A1 | 12/2017 | Gilliland | |
| 2018/0070804 A1 | 3/2018 | Tesar | |
| 2018/0149732 A1 | 5/2018 | Droz | |
| 2018/0329067 A1 | 11/2018 | Boehmke | |
| 2019/0146505 A1 | 5/2019 | Boehmke | |

FOREIGN PATENT DOCUMENTS

| | | |
|---|---|---|
| CN | 103152518 | 6/2013 |
| CN | 103179339 | 6/2013 |
| CN | 203353019 | 12/2013 |
| CN | 103001428 | 5/2015 |
| CN | 102857592 | 12/2015 |
| CN | 103146355 | 2/2016 |
| EP | 1816514 | 8/2007 |
| EP | 1816514 | 8/2017 |
| JP | H09163197 | 6/1997 |
| JP | H09326032 | 12/1997 |
| JP | H09163197 | 12/1998 |
| JP | H09326032 | 6/1999 |
| JP | 2011088623 | 4/2001 |
| JP | 2005024463 | 1/2005 |
| JP | 2011123078 | 12/2010 |
| JP | 2011088623 | 5/2011 |
| JP | 2011123078 | 6/2011 |
| JP | 2014053408 | 3/2014 |
| RU | 2493988 | 9/2013 |
| RU | 2012154453 | 6/2014 |
| RU | 2014146890 | 6/2016 |
| WO | WO 2011/104706 | 9/2011 |
| WO | PCT/JP2014/053408 | 3/2014 |

OTHER PUBLICATIONS

Office Action in CA2,902,430 dated Dec. 15, 2017.
ISR and Written Opinion in PCT/US2018/023885 dated Aug. 16, 2018.
Office Action in CN201480022190.5 dated Aug. 22, 2017.
Office Action for CN 201480022190.5, dated Aug. 22, 2017, 17 pages.
Office Action for CA 2,902,430, dated Dec. 15, 2017, 8 pages.
Office Action for JP 2016-502343, dated Jan. 30, 2018, 5 pages.
Supplemental Partial European Search Report for EP 17760835,3, dated Jan. 16, 2019, 3 pages.
Office Action for EP 14770009.0 dated Apr. 24, 2019, 3 pages.

* cited by examiner

CALIBRATION FOR AN AUTONOMOUS VEHICLE LIDAR MODULE

BACKGROUND

For calibration of autonomous vehicle (AV) or autonomous vehicle (AV) sensor systems, each sensor can be individually calibrated prior to installation for ranging and imaging accuracy. However, observations of intrinsic calibration of certain LIDAR modules has confirmed that inconsistencies and inaccuracies in the initial intrinsic calibrations are common.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
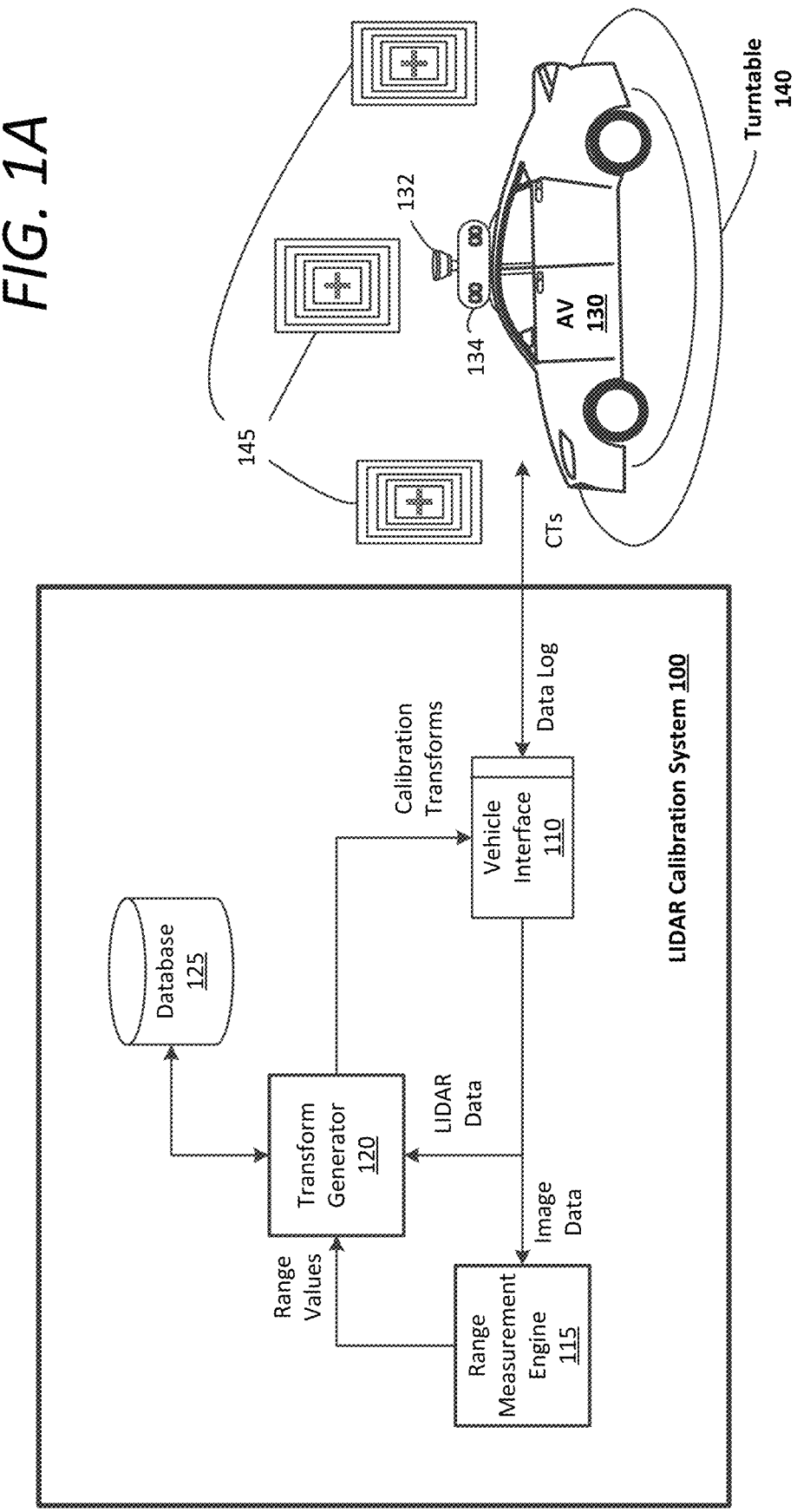
FIG. 1A is a block diagram illustrating an example LIDAR calibration system, as described herein.

Example embodiments are described herein in the context of autonomous vehicles (AVs) for illustration purposes. However, it will be appreciated that the disclosure is not so limited and that alternative embodiments can include human-driven cars, such as but not limited to LIDAR-based mapping vehicles.

Certain "full vehicle" calibration techniques of AV sensor systems involve a complete accuracy and position calibration with all sensors in their final location on the AV. The advantages of fill vehicle calibration can include significant time savings, negating any potential alteration of the sensors during installation, and enabling recalibration after a period of time to quantify drift in the extrinsic and intrinsic calibration parameters. However, current full vehicle calibration techniques can still be quite precarious and labor intensive, typically involving manual handling of a calibration array or manual setup of the calibration array to enable a human driver to manually drive the AV to expose the sensor systems to the calibration array, Outdoor implementations involving human drivers can result in inconsistencies between sensor data collections due to, for example, inconsistent lighting conditions or inconsistent drive pattern by a human driver. Furthermore, manual calibration corresponding to a crew of technicians physically moving a calibration array around an AV to provide full exposure of fiducials to the AV's sensor system can also result in inconsistent paths, speed, and orientation, which also results in inconsistent data collection. Such inconsistencies can result in an imperfect calibration of the AV's sensor systems, which can impact on-board data processing and even safety.

Furthermore, an added challenge regarding full vehicle calibration is related to data collection. During data collection, a number of degrees of freedom, possibly a large number, should be observable in order to determine (e.g., via optimization) depth, angles, distortions, scale, etc., due to their interrelatedness in the calibration process. As an example, to measure depth accuracy, the calibration may observe a target at various depths in order to model parameters to be fitted properly to the acquired sensor data. Given the wide range of parameters to determine or calculate during calibration, the data collection can become a daunting task, where precisely choreographed motions are required to position the sensors relative to fiducial targets.

To address the shortcomings of current calibration techniques, a LIDAR calibration system is described herein. The LIDAR calibration system can operate on-board the AV, or remotely to the AV as, for example, one or more servers in remote communication with the AV (e.g., over a wireless network). In various examples, the AV can be situated on a turntable. Additionally, the turntable can include an inclined plane or an actuatable platform on which the AV can rest. In certain aspects, the inclined plane or actuatable platform can cause greater range variation for the laser scanners of the LIDAR module of the AV. In certain aspects, calibration of the laser scanners may be split between an upper set of laser scanners and a lower set of laser scanners. In certain examples, the upper set of laser scanners can have a vertical field of view above the horizontal plane, and the lower set of laser scanners can have a vertical field of view below the horizontal plane.

In variations, a number (e.g., a majority) of the upper set of laser scanners can have a vertical field of view above the horizontal plane (e.g., a positive incidence or elevation angle), with a number of the upper set of laser scanners having a slight negative incidence angle. For example, the upper set of laser scanners can comprise longer range lasers that can target objects at greater distances (e.g., more than fifty meters). In certain aspects, the upper set of laser scanners can comprise laser scanners having an incidence angle greater than a threshold incidence angle (e.g., approximately negative five degrees).

In example embodiments described herein, the lower set of laser scanners can be utilized for shorter distance ranging (e.g., within fifteen meters of the AV), and the upper set of laser scanners can be utilized for longer distance ranging (e.g., up to and over one hundred meters). It is thus recognized that different calibration processes can be used to calibrate the upper and lower sets of laser scanners for their respective uses. In certain implementations, the lower set of laser scanners can be calibrated in an indoor, controlled calibration environment that includes the turntable and a set of fiducial targets (e.g., comprising checkerboard markers and/or custom-tailored targets for correlating image data and LIDAR data). Additionally, the upper set can also be calibrated in the indoor, controlled calibration environment. However, due to the nature of the calibration environment—where fiducial targets are relatively close to the AV (e.g., within fifteen meters)—the upper set of laser scanners are not necessarily effectively calibrated in the indoor environment for environments encountered during operation.

According to various examples, an on-board control system of the AV can perform a calibration check and/or recalibrate the upper set of laser scanners outside the controlled calibration environment. For example, one or more planar surfaces can be correlated to a calibration trigger location in a road network. As provided herein, a planar surface can comprise a known surface external to an AV calibration facility. In various examples, a planar surface can comprise a flat surface, such as a building surface, a billboard, a road sign, a specially placed fiducial target for the specific purpose of calibration, or any other suitable surface which the upper set of laser scanners can target. Other embodiments can use non-planar surfaces with known geometry, such as guard rails, hillsides, a natural object (e.g., a rock wall or large tree, parked vehicles, and the like). In one aspect, the calibration trigger location can correspond to a location identified in a map, such as a localization sub-map. Additionally or alternatively, the calibration trigger location can correspond to a location determined via external markers, such as a wireless beacon or suitable device that provides a signal to the AV that facilitates locating the calibration trigger location.

When the AV intersects with a calibration trigger location, the AV can perform a calibration check of the upper set of laser scanners by detecting and analyzing return signals from the known planar surface. The distance from the calibration trigger location and the planar surface may be predetermined, or may be measured by the AV based on, for example, image data from one or more stereo cameras.

In variations, the AV can record a point cloud map corresponding to the planar surface, which can reveal any anomalous return signals that correspond to a poorly calibrated laser scanner. During the calibration check, the AV can determine whether the intrinsic parameters of each laser scanner in the upper set are within nominal ranges. In certain examples, if the intrinsic parameters of a respective laser scanner are not within nominal ranges, then the AV can schedule a recalibration, or in some aspects, can independently make adjustments to the respective laser scanner or generate a new calibration transform based on the calibration check.

For calibration within the controlled calibration environment, the AV can be parked on a turntable, either flat on the turntable or on an inclined surface. Additionally or alternatively, the AV can be parked on an actuatable platform having a number of actuators that can change pitch and/or roll of the platform while the turntable controls the yaw, which can increase range variation in the return signals, allowing for a more robust calibration of the set of laser scanners of the LIDAR module. In certain aspects, both the upper and lower sets of lasers scanners can be calibrated while the AV is situated on the turntable (e.g., either on the inclined surface or the actuated platform). For the set of laser scanners, the LIDAR calibration system can detect a set of return signals from a plurality of fiducial targets. Based on the return signals, the LIDAR calibration system can generate a set of calibration transforms that account for or otherwise adjust a set of intrinsic parameters of the LIDAR module.

The intrinsic parameters of the LIDAR module describe the measurements of each laser scanner and a coordinate transformation between the laser scanner's coordinate frame and the LIDAR's fixed coordinate system. The intrinsic parameters of the LIDAR module include a plurality of offset angles for each laser scanner of the LIDAR module (e.g., from a desired center angle). The intrinsic parameters of each laser scanner can also include an elevation angle (or incidence angle), scale, and timing characteristic. The LIDAR calibration system can determine the range measurements of the plurality of fiducial targets based on image data from at least one camera (e.g., a camera of the autonomous vehicle).

In determining the intrinsic parameters, the LIDAR calibration system can execute a set of transform models on LIDAR data (e.g., in a calibration facility targeting prearranged fiducial targets). In certain implementations, each transform model can comprise one or more functions (e.g., linear or non-linear cost functions) to determine the intrinsic parameters of a laser scanner, and variations of the intrinsic parameters from a fully calibrated state. Based on the determined variations in the intrinsic parameters, the LIDAR calibration system can generate a set of calibration transforms executable to dynamically adapt for the variations. The generated set of calibration transforms can account for any deviations in the intrinsic parameters of the LIDAR module, resulting in a more accurate point cloud map for the AV's surrounding environment.

Among other benefits, the examples described herein achieve a technical effect of calibrating the intrinsic parameters of a LIDAR module with increased precision as compared to the initial manufacturer calibration, which can be inaccurate and inconsistent. Increased precision can alleviate the load of on-board processing resources of the AV in performing perception and object classification operations, and can lead to safer and more robust AV systems.

As used herein, a set of "transform models" can intrinsically calibrate a LIDAR module by calibrating the intrinsic parameters of the individual laser scanners of the LIDAR module, and can comprise computational functions applied to raw LIDAR data to determine the intrinsic variations resultant from, for example, manufacturing, initial setup, hand alignment and adjustment, and/or initial calibration of the LIDAR module. In certain examples, a transform model can comprise one or more linear or non-linear cost functions that determine variations in the intrinsic parameters of a laser scanner.

A set of "calibration transforms" can execute on-board the AV to adjust for the variations in the intrinsic parameters across an entire laser scanner array of the LIDAR module (e.g., a LIDAR module having sixty-four channels). In some examples, raw LIDAR data from a LIDAR module of the AV can be initially processed by the set of calibration transforms to generate an accurate point cloud map, which can then be processed and/or analyzed by a control system of the AV. Using the more accurate point cloud map, the control system can autonomously perform perception, prediction, motion planning, and vehicle control operations. Thus, in various applications, a calibration transform can dynamically adjust for the determined intrinsic variations of a laser scanner. As described herein, a calibration transform can be generated based on the non-linear cost functions that identify the variations in the intrinsic parameters of the laser scanner. A set of calibration transforms can comprise computer-executable code or algorithms (e.g., executable by on-board processing resources of the AV) and can dynamically adjust the intrinsic parameters across the entire laser scanner array of the LIDAR module (e.g., a LIDAR module having sixty-four channels) in order to dynamically generate a calibrated point cloud map of the surrounding environment of the AV.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the execution of software, code, and/or computer-executable instructions. These instructions can be stored in one or more memory resources of the computing device. A programmatically performed step may or may not be automatic. An action being performed automatically, as used herein, means the action is performed without necessarily requiring human intervention.

One or more examples described herein can be implemented using programmatic modules, engines, or components. A programmatic module, engine, or component can include a program, a sub-routine, a portion of a program, and/or a software component and/or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an AV. An AV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle.

Example Systems

FIG. 1A is a block diagram illustrating an example LIDAR calibration system 100, as described herein. The LIDAR calibration system 100 can comprise a number of logical modules or engines described in connection with FIG. 1A. These logical modules or engines can correspond to one or more processors (e.g., on-board CPUs or remote servers) executing software, algorithms, and/or computer-executable instructions, as described herein. Referring to FIG. 1A, the LIDAR calibration system 100 includes a vehicle interface 110, a range measurement engine 115, a transform generator 120, and a database 125. Example methods of calibrating the intrinsic parameters of a LIDAR module, implemented by the range measurement engine 115 and the transform generator 120, are described in greater detail in connection with FIGS. 6, 7, 8A, and 8B. In various examples, the LIDAR calibration system 100 can be operatively coupled to an AV 130, which includes the LIDAR module 132 and camera(s) 134. As shown, the AV 130 is positioned on a turntable 140 in proximity of one or more fiducial targets 145. Although FIG. 1A shows the LIDAR calibration system 100 as being external to the AV 130, it will be appreciated that the AV 130 can include one or more blocks 110, 115, 120, 125 of the LIDAR calibration system 100 in alternative embodiments.

In various examples, the LIDAR calibration system 100 can be implemented as one or more computing systems in combination with a number of automated mechanisms and fiducial targets 145 to control or otherwise guide an AV 130 through a precise and repeatable procedure in order to provide consistent calibration of the AV's LIDAR module 132. In some examples, the automated mechanism can comprise a conveyer system that locks the AV 130 to a track, pulling it past a set of pre-placed fiducial targets. According to examples described herein, the automated mechanism can comprise the turntable 140 onto which the AV 130 is positioned to be rotated in place.

Figure 1B:
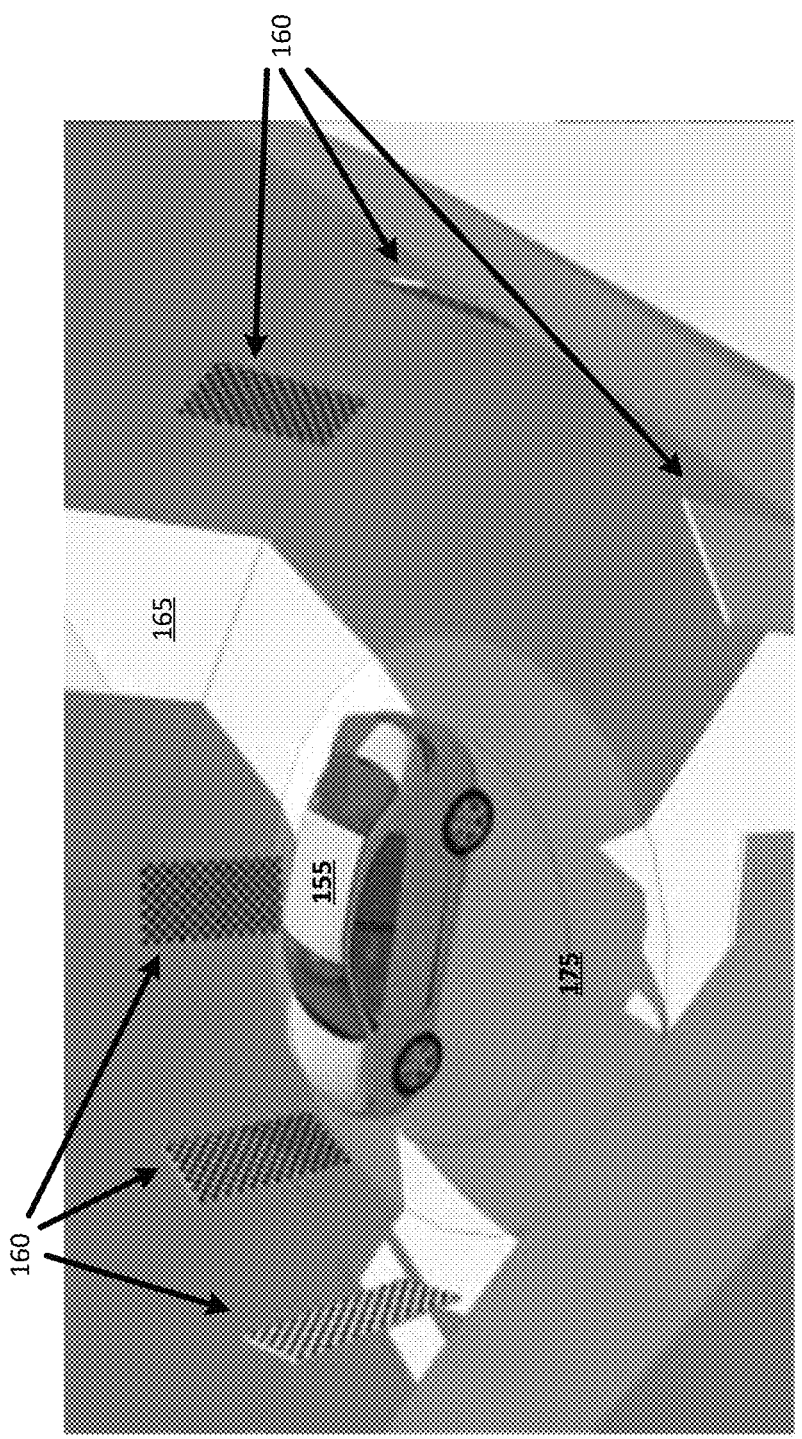
FIG. 1B is a block diagram illustrating a vehicle sensor calibration facility, according to various example embodiments.

In one example, the AV 130 self-drives onto and off the turntable 140. For example, the LIDAR calibration system 100 can comprise an indoor controlled environment (such as shown in FIG. 1B, and can include an entrance/exit location (or separate entrance and exit locations) through which the AV 130 can self-drive. In variations, the LIDAR calibration system 100 can include a combination conveyor system and turntable 140 to allow for automated control of the AV 130 in entering, positioning, and exiting the vehicle sensor calibration system 100.

According to various examples, the fiducial targets 145 can comprise specialized markers for calibrating the LIDAR module 132. In some implementations, the fiducial targets 145 can each comprise a number of distinct patterns (e.g., a checkerboard pattern) to provide the LIDAR systems and camera systems with a data acquisition environment in order to run a calibration operation that can fuse the acquired data for each sensor. As described herein, the LIDAR calibration system 100 can operate remotely to the AV 130, or can be included as an on-board system that utilizes the processing resources of the AV 130 (e.g., a computer stack that autonomously operates the control mechanisms of the AV).

The LIDAR calibration system 100 can include a vehicle interface 110 that can link with the sensor suite and/or control system (not shown) of the AV 130 (e.g., via a wireless network or wired connection). For example, the vehicle interface 110 can receive a data log from the AV 130 corresponding to the AV 130 acquiring point measurement data from the LIDAR module 132 as the turntable 140 spins the AV 130. Additionally, the data log can further include image data from one or more cameras 134 of the AV 130. The data log can comprise a log set of recorded sensor data (e.g., LIDAR data, video data, radar data, etc.) that identifies the fiducial targets 145. The LIDAR calibration system 100 can process the raw sensor data in the log sets received over the vehicle interface 110 to determine the intrinsic parameters of each laser scanner of the LIDAR module 132, and to generate a set of calibration transforms to calibrate the intrinsic parameters.

In various examples, the LIDAR calibration system 100 can include the range measurement engine 115 that can process the image data to determine accurate range measurements to specific features of the fiducial targets 145 (e.g., corners of checkboards or the center of specific markers). The resultant range values can then be used to compare with return signals from the LIDAR module 132.

The LIDAR calibration system 100 can include a transform generator 120 that receives LIDAR data from the data log and the range values from the range measurement engine 115. In various examples, the LIDAR calibration system 100 can further include a database 125 storing sets of calibration logs for the cameras 134, LIDAR module 132, and other sensors of the AV 130. For example, a calibration for the AV 130 may be time-stamped for reference in later calibrations of the AV 130 and other AVs. For the control system of the AV 130 to operate properly and efficiently, sensor data correlation or fusion between the AV's cameras 134 and the laser scanners of the LIDAR module 132 should meet a level of precision and accuracy. Accordingly, coordinate frame transformation between a reference camera 134 and the laser scanners of the LIDAR module 132 should be accurate. In various implementations, the calibration logs stored in the database 125 can identify the precise extrinsic parameters of the cameras 134 and LIDAR module 132 on the AV 130. Additionally or alternatively, the extrinsic parameters can be measured manually or known from, for example, the sensor installation process or manufacturer settings.

Based on the range values and the return signals in the LIDAR data, the transform generator 120 can perform the extrinsic coordinate frame transformation between the cameras 134 and the laser scanners of the LIDAR module 132 to determine whether the intrinsic parameters of each laser scanner of the LIDAR module 132 are within a set of nominal ranges. The intrinsic parameters of each laser scanner can correspond to scale, offset angles, a targeted elevation, return signal intensity, and/or time synchronization, which ultimately govern the accuracy of the three-dimensional point cloud generated by the LIDAR module 132. Poor modeling of the intrinsic parameters of a LIDAR module 132 can be caused by, for example, inconsistency or errors in the initial calibration, which can require a detailed recalibration of the LIDAR module 132 in which each set of intrinsic parameters of each laser scanner needs to be determined and, in some cases, adjusted independently. Furthermore, it can be desirable to gather data samples at different range values and incident angles for each laser scanner to calibrate the intrinsic parameters of that laser scanner.

In various implementations, the turntable 140 can spin the AV 130, and the cameras 134 and the LIDAR module 132 can generate sensor data identifying the various features of the fiducial targets 145. The transform generator 120 can correlate the range values from the range measurement engine 115 with the LIDAR data to generate a set of calibration transforms to account for variations in each laser scanner's intrinsic parameters and/or otherwise calibrate the intrinsic parameters of the LIDAR module 132. In certain aspects, the calibration transforms can be implemented by the AV 130 to generate a more accurate point cloud map from the LIDAR module 132.

FIG. 1B is a block diagram illustrating a vehicle sensor calibration facility, according to various examples. In the below discussion with respect to FIG. 1B, the LIDAR calibration system 100 can be included as a component of the facility 150, or as a standalone system for use with any calibration environment. Referring to FIG. 1B, an AV 155 can include a sensor suite and can autonomously drive into the facility 150 or can be manually driven into the facility 150 via an entrance and exit location 165. In certain implementations, the facility 150 can include one or more doors that can close when the AV 155 enters the facility 150 to ensure consistent lighting conditions. Still further, the temperature of the facility can be controlled in order to provide constant calibration conditions for multiple AVs.

In variations, the facility 150 can include a conveyor system that guides or propels the AV 155 into the facility 150 and onto the turntable 175. According to examples described herein, the facility 150 can include a plurality of fiducial targets 160 that can be sensed by the AV's sensor suite (e.g., the AV's camera and LIDAR systems) as the AV 155 rotates on the turntable 175. The fiducial targets 160 can act as standardized references for measurement. Thus, the LIDAR calibration system 100 can analyze the sensor data from the AV 155 using the fiducial targets 160 as calibration references to generate a set of calibration transforms to compensate for the systematic variations in the intrinsic parameters of each laser scanner of the AV's LIDAR module.

Figure 2A:
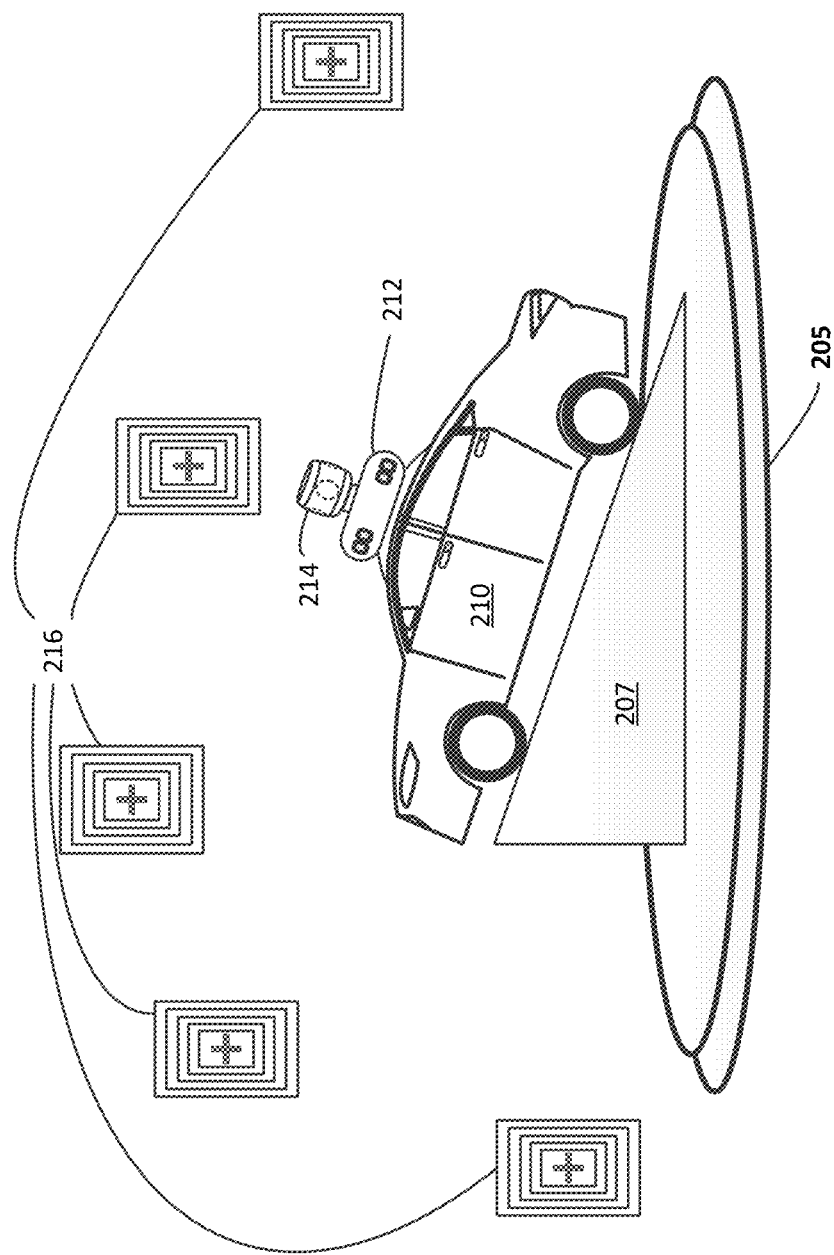
FIG. 2A depicts an AV being rotated on a turntable of a vehicle sensor calibration facility in accordance with an example embodiment.

FIG. 2A depicts an AV being rotated on a turntable of a vehicle sensor calibration facility. The AV 210 can be in communication with, or can include, a LIDAR calibration system 100 as described with respect to FIG. 1A. Referring to FIG. 2A, the turntable 205 can include an inclined surface 207, such as a ramp, which can act to increase range variation and incident angles of the LIDAR return signals. Accordingly, as the AV 210 spins on the turntable 205 while being situated on the inclined surface 207, the LIDAR module 214 and cameras 212 can generate sensor data (e.g., image and LIDAR data) based on the fiducial targets 216, which can be processed by the LIDAR calibration system 100 for a more robust calibration of the intrinsic parameters of the LIDAR module 214. In various examples, the inclined surface 207 can comprise a static ramp either placed on or mounted to the turntable 205 such that the inclined surface 207 spins with the turntable 205.

Figure 2B:
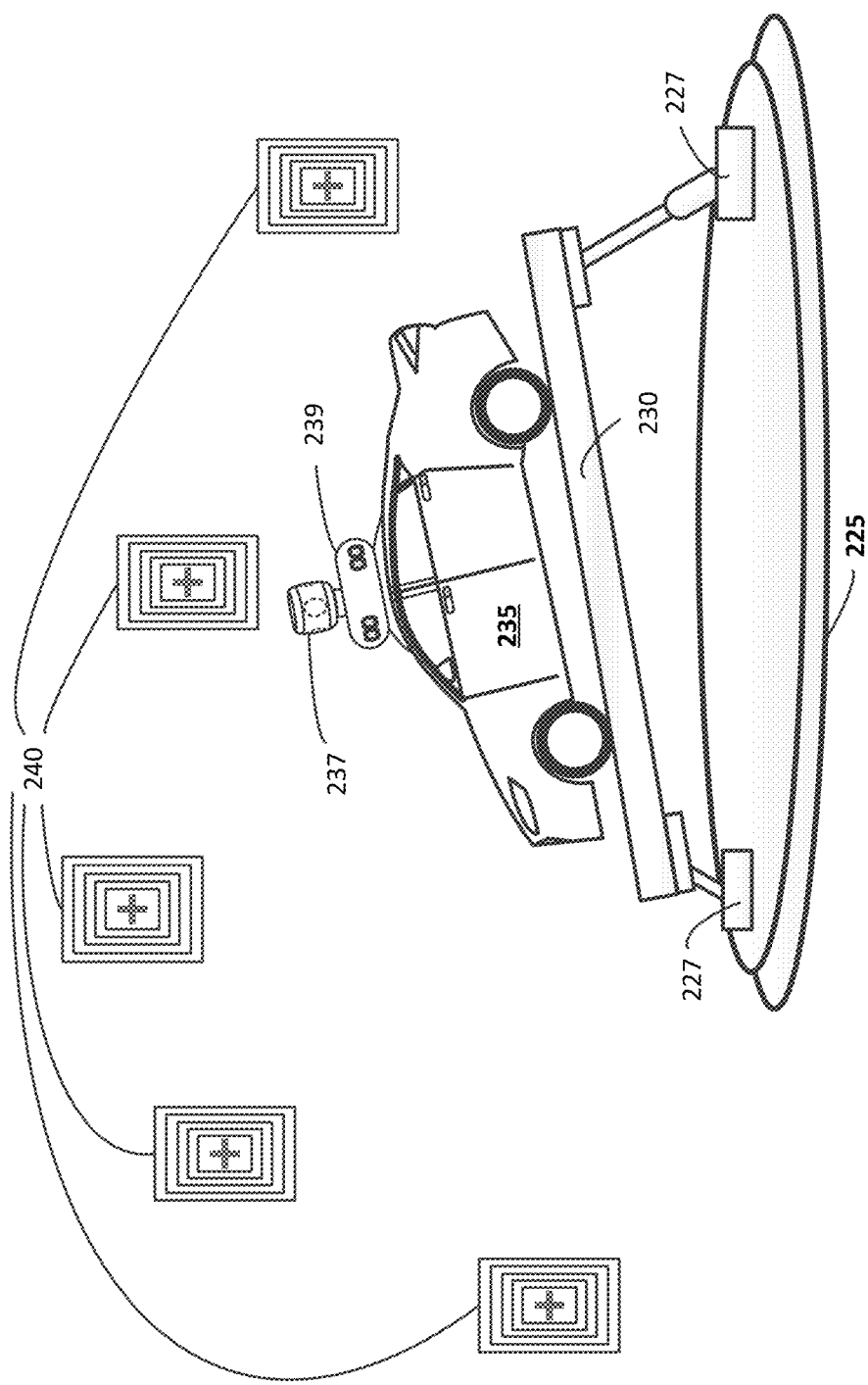
FIG. 2B depicts an AV being rotating on an actuated calibration platform of a vehicle sensor calibration facility in accordance with an example embodiment.
Figure 2C:
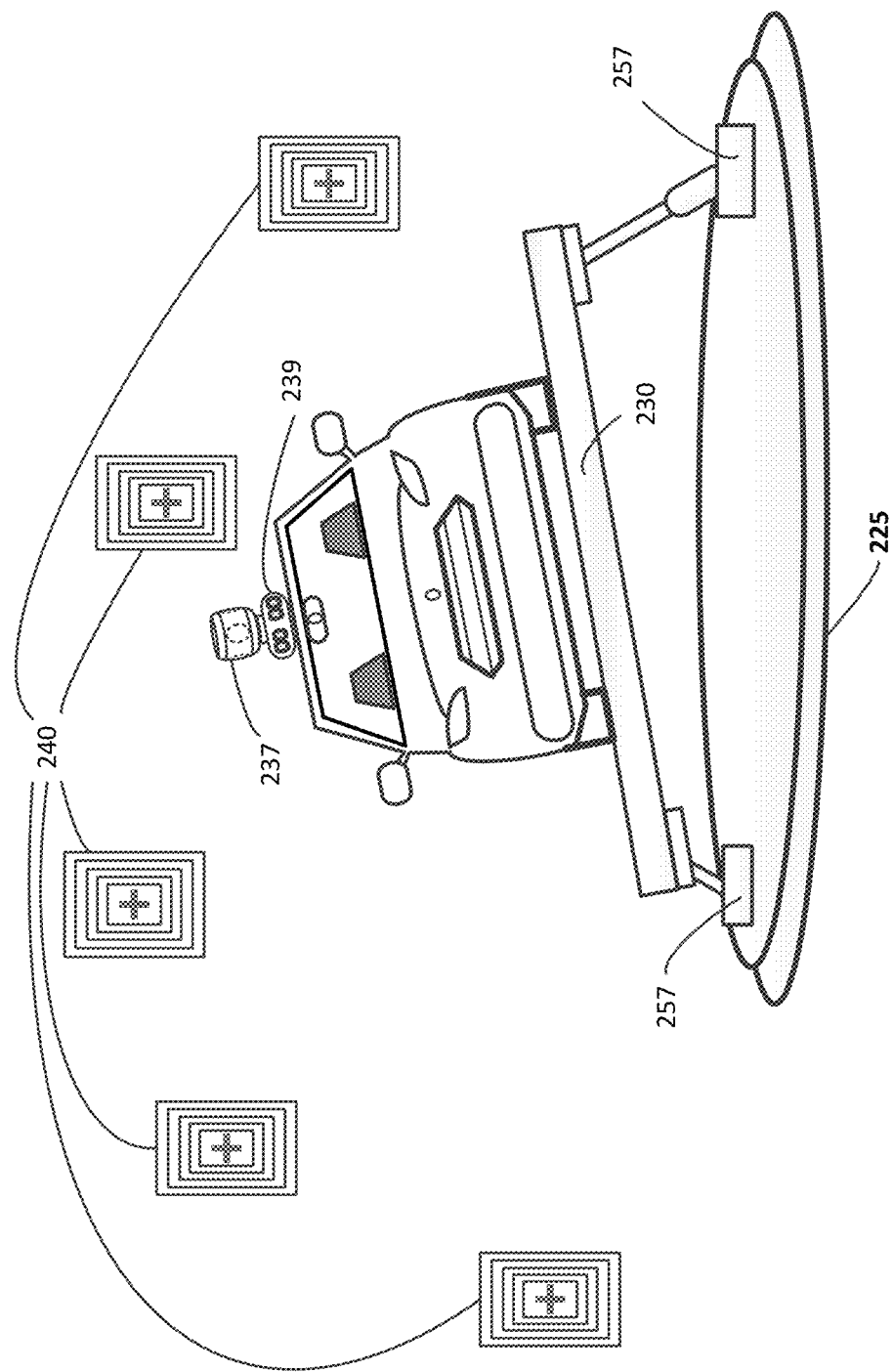
FIG. 2C also depicts an AV being rotated on an actuated calibration platform of a vehicle sensor calibration facility in accordance with an example embodiment.

FIGS. 2B and 2C depict an AV being rotated on an actuated calibration platform of a vehicle sensor calibration facility. In the examples shown in FIGS. 2B and 2C, the pitch and/or roll angles of the calibration platform 230 can be controlled by one or more actuators 227, 257, while the turntable 225 controls the yaw of the calibration platform 230. In certain implementations, each actuator 227, 257 can comprise a single servo or actuator capable of controlling both roll and pitch or can comprise multiple servos or actuators operating in concert to achieve a set of desired roll and/or pitch angles for the calibration platform 230. In various examples, the turntable 225 can rotate the AV 235 while the actuators 227, 257 dynamically adjust the pitch and roll angles, or the LIDAR calibration system 100 can set the angles prior to activating the turntable 225. The result is increased range variation and incident angles for the laser scanners, making the calibration transforms generated by the transform generator 120 more robust, and thus making the point cloud map generated by the LIDAR module 132 more accurate.

However, it is contemplated that the relatively short distance to the fiducial targets 240 may bolster the accuracy of a lower set of laser scanners of the LIDAR module 237, which can operate in short ranges (e.g., having a field of view below the horizontal plane). For longer range laser scanners, e.g., comprising an upper set of laser scanners of the LIDAR module 237 which has approximately neutral or positive elevation angles above the horizontal plane, the use of short-distance fiducial targets 240 alone may not be sufficient to calibrate the intrinsic parameters of those laser scanners.

Figure 3A:
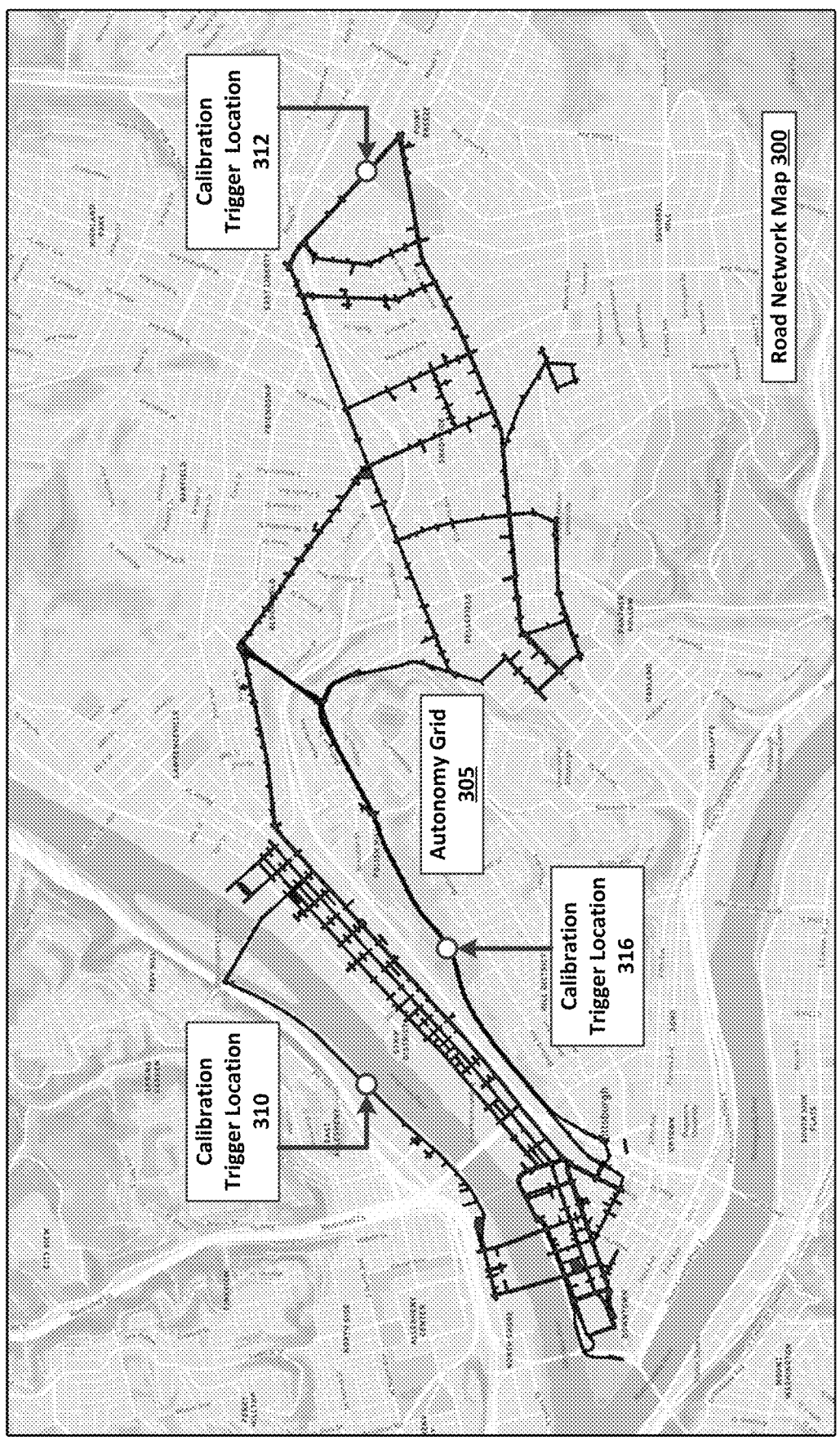
FIG. 3A illustrates a road network map indicating an autonomy grid and calibration location triggers in accordance with an example embodiment.

FIG. 3A illustrates a road network map indicating an autonomy grid and calibration location triggers for making the intrinsic parameter calibration of the LIDAR module's long-range laser scanners more robust. In various examples, the road network map 300 can display the roads, road names, and other features of a given region. The road network map 300 can include an autonomy grid 305 (shown in bold) that indicates the roads and paths on which AVs can operate. For example, the autonomy grid 305 can correspond to roads that have been fully mapped by specialized mapping vehicles that record localization maps comprising fused LIDAR and image data, which can be processed and labeled, and then stored on AVs for perception and object classification purposes. In some aspects, each localization map, or labeled sub-map, can correspond to a particular road segment, and can be accessed by a control system of the AV to dynamically compare with live sensor data.

In order to facilitate the intrinsic parameter calibration of longer-range laser scanners, a number of planar surfaces may be selected within a certain distance from a segment of the autonomy grid 305. A planar surface can correspond to a building surface, a road sign, a billboard, a house, a fiducial target placed specifically for calibration purposes, a natural surface (e.g., a granite wall or a hillside) or other structure that is a certain distance from the road (e.g., ~100 meters), and which can be used to confirm or check the calibration, or to perform the intrinsic calibration of the upper set of laser scanners of the LIDAR module. Each selected planar surface can be correlated to a calibration trigger location 310, 312, 316 along the autonomy grid 305. The calibration trigger location 316 can be indicated on a sub-map or a general road network map used for navigation. For example, calibration trigger location 310 can correspond to a building that is some 100 meters away from the trigger location 310. Upon approaching the trigger location 310, an AV can collect LIDAR and image data of the building, which the LIDAR calibration system 100 can process to calibrate the intrinsic parameters of the upper set of laser scanners, as described above with respect to FIG. 1A. Accordingly, the building can serve as a fiducial target for the upper set of laser scanners.

Figure 3B:
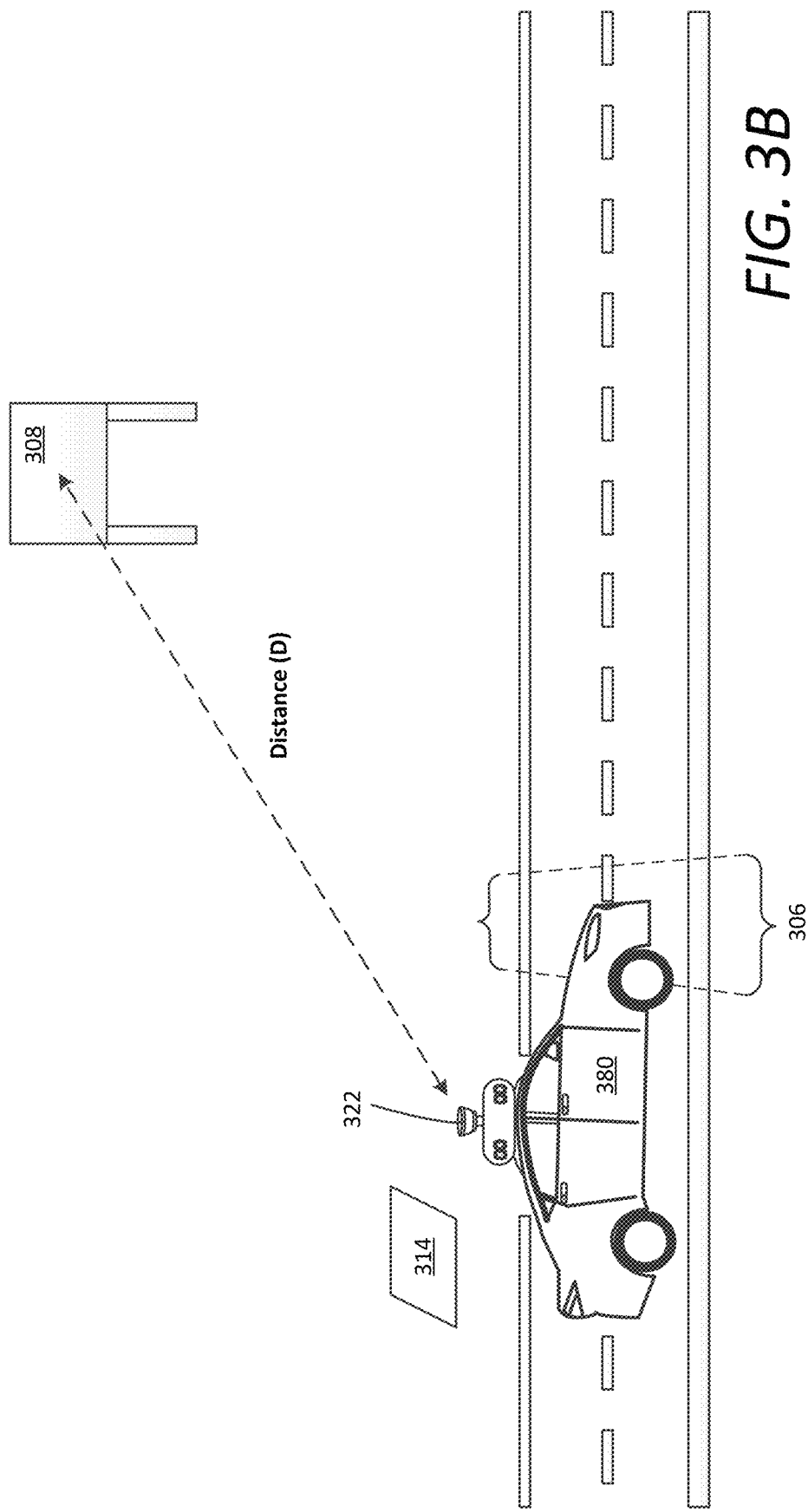
FIG. 3B depicts an AV initiating a calibration check at a calibration trigger location in accordance with an example embodiment.

FIG. 3B depicts an AV initiating a calibration check at a calibration trigger location. According to examples described herein, the AV 380 can perform a calibration check of the upper laser scanners, or can perform the intrinsic parameter calibration of the laser scanners independently. In variations, the AV 380 can transmit a log set comprising sensor data of the planar surface 308 to a remote LIDAR calibration system 100 over one or more networks, which can calibrate the intrinsic parameters of the laser scanners and transmit an updated set of calibration transforms back to the AV 380. In other variations, the AV 380 can comprise processing resources executing intrinsic parameter calibration instructions to perform the calibration and generate the updated calibration transforms accordingly.

In doing so, the control system of the AV 380 can determine whether the set of intrinsic parameters of a particular laser scanner is within a set of nominal ranges in the manner described herein with respect to FIG. 1A. The control system can perform a calibration check for each laser scanner that detects a return signal from the planar surface 308. If the intrinsic parameters are not within nominal ranges (e.g., for offset angles, elevation angle, scale, timing, etc.), the control system of the AV 380 can recalibrate the laser scanner by generating an updated calibration transform for the laser scanner to account for the systematic variations. As used herein, recalibration can correspond to computationally accounting for the systematic variations, as opposed to mechanically adjusting the lasers or detectors. Cumulatively, the updated set of calibration transforms for the laser scanner can make the three-dimensional point cloud map generated by the AV's LIDAR module 322 more robust and accurate.

As described herein, the planar surface 308 corresponding to a calibration trigger location 310 can be utilized for the long-range laser scanners of the LIDAR module 322 (e.g., an upper set of laser scanners having a field of view above the horizontal plane). Accordingly, the planar surface 308 may be preselected as having an adequate distance and surface features for the calibration. It is further contemplated that the intrinsic parameters of the long-range laser scanners can be initially calibrated in the indoor calibration facility using the fiducial targets, and the planar surface 308 may be utilized to check or verify the indoor calibration.

In certain examples, the lower set of laser scanners may also be intrinsically calibrated, or the intrinsic calibration may be checked, at a calibration trigger location 306. For example, one or more close range calibration surfaces 314 may be placed or otherwise selected to enable the AV 380 to perform an intrinsic calibration check and/or intrinsically calibrate the lower set of laser scanners. As described herein, the close range calibration surface 314 can comprise a natural surface, such as a rock surface or hillside, or a human-made surface, such as a road feature, guardrail, or a road sign.

Figure 4:
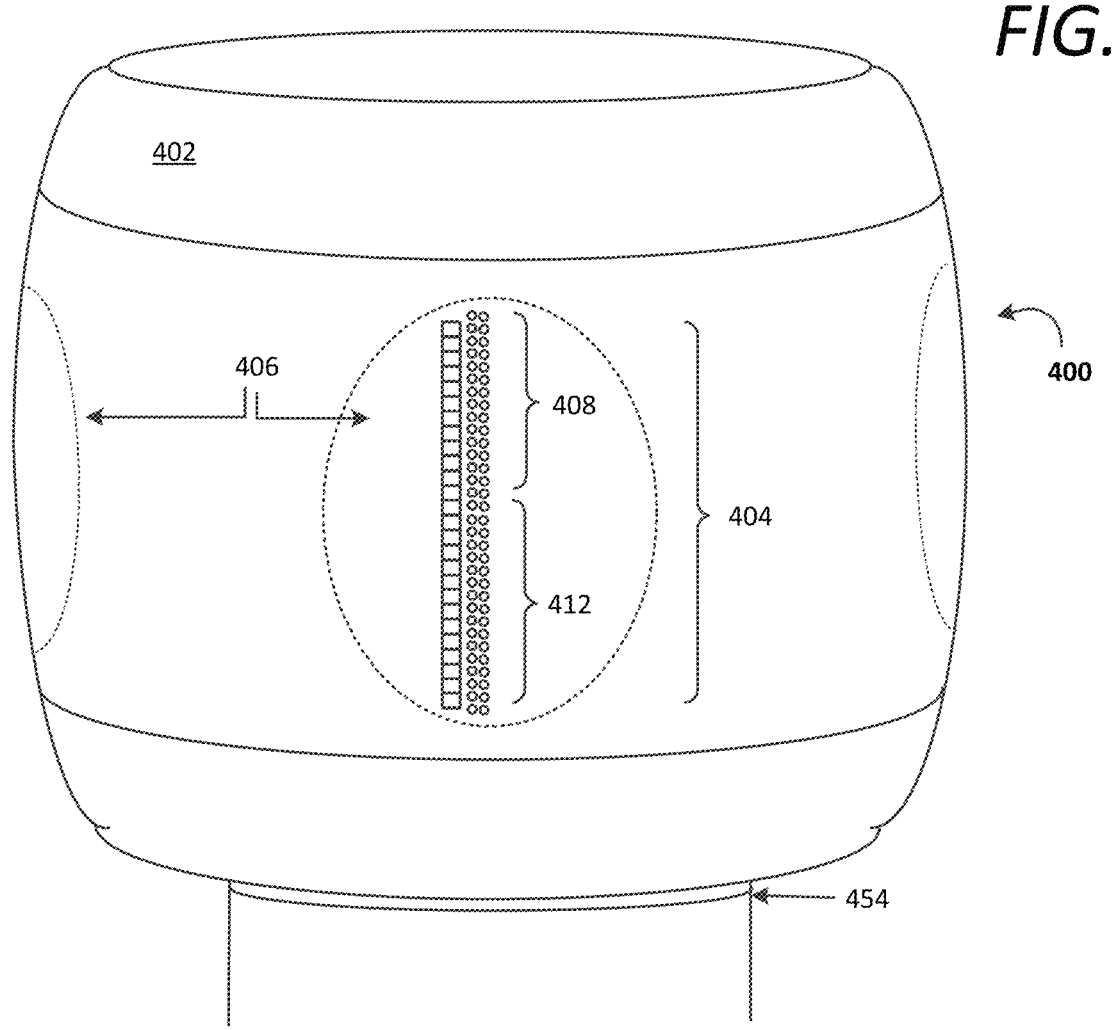
FIG. 4 illustrates an example LIDAR module, according to examples described herein.

FIG. 4 illustrates an example LIDAR module 400, according to examples described herein. The LIDAR module 400 shown in FIG. 4 can correspond to the LIDAR module 132, 214, 237 shown and described with respect to FIGS. 1A, 2A, 2B, and 2C. In various implementations, the LIDAR module 400 can comprise a housing 402 that houses one or more laser scanner arrays 404, and can include one or more view panes 406 through which the light from the laser scanner array(s) 404 is emitted and detected. In a number of aspects, the LIDAR module 400 can rest on or be mounted to a swivel bearing 454 which enables the LIDAR module 400 perform an angular sweep or rotate 360 degrees. For example, the LIDAR module 400 can be rotated by a rotary motor that can spin the LIDAR module 400 at a certain rate (e.g., at twenty revolutions per second).

According to examples described herein, the laser scanner array 404 may be divided into an upper set of laser scanners 408 and a lower set of laser scanners 412. In some aspects, the upper set of laser scanners 408 can each have a vertical field of view equal to or above a horizontal plane extending from the LIDAR module 400 (e.g., approximately neutral or positive elevation angles), whereas the lower set of laser scanners 412 can have a vertical field of view below the horizontal plane (i.e., negative elevation angles). In variations, the upper set of laser scanners 408 can comprise laser scanners having an elevation angle greater than a certain negative incidence angle with respect to the horizontal plane (e.g., negative five degrees), and the lower set 412 can comprise the laser scanners having an incidence angle less than all of the upper set of laser scanners 408. As described herein, the intrinsic parameters of the lower set of laser scanners 412 can be calibrated using the fiducial targets and turntable implementations described herein. In some aspects, the intrinsic parameters of the upper set of laser scanners 408 can also be initially calibrated using the fiducial targets and turntable implementations. Additionally or alternatively, the intrinsic parameters of the upper set of laser scanners 408 can be calibrated using planar surfaces corresponding to calibration trigger locations along an autonomy grid of a road network.

Example Autonomous Vehicle

Figure 5:
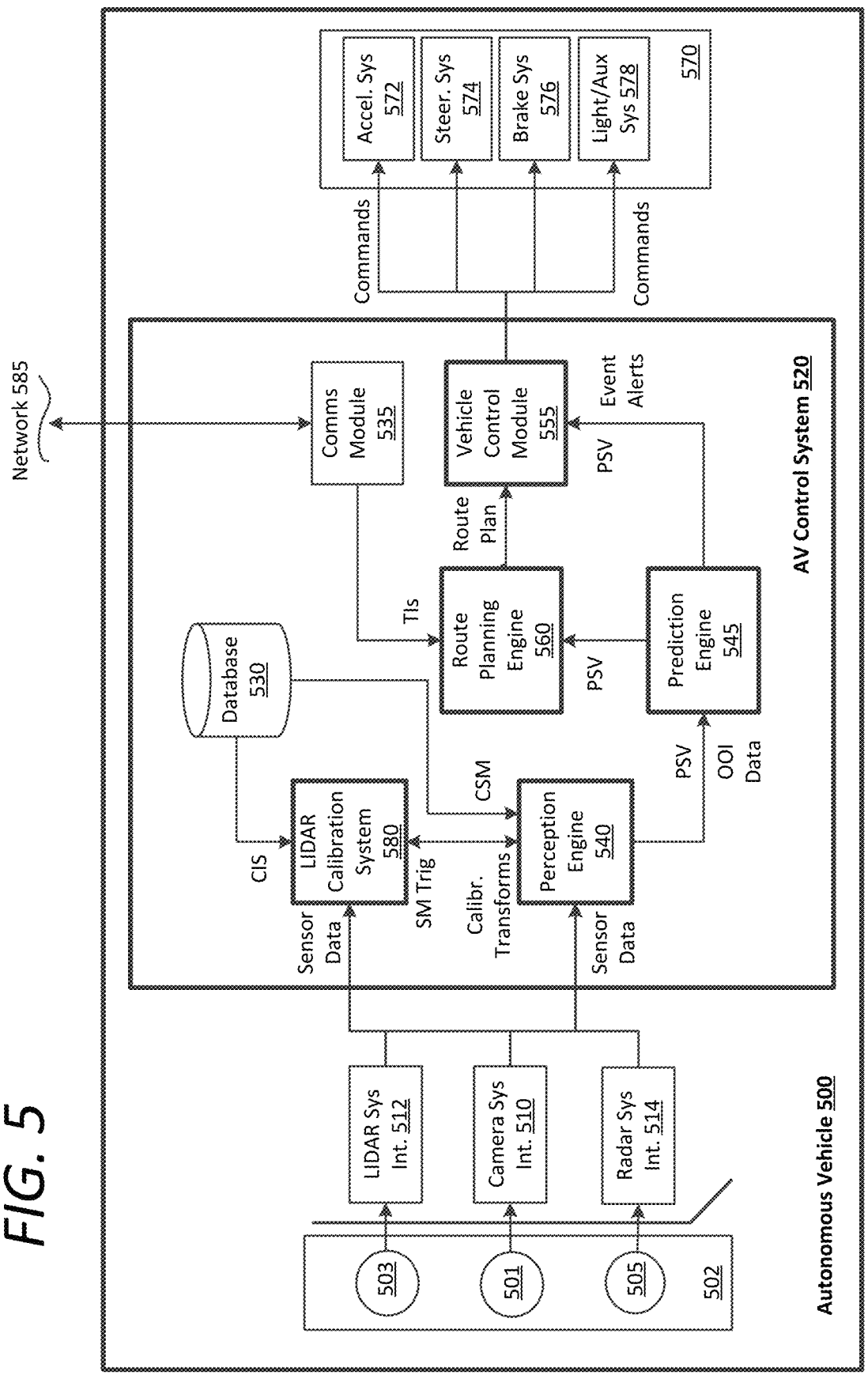
FIG. 5 is a block diagram illustrating an example AV implementing a control system in accordance with an example embodiment.

FIG. 5 is a block diagram illustrating an example AV implementing a control system, as described herein. In an example of FIG. 5, an AV control system 520 can autonomously operate the AV 500 in a given geographic region for a variety of purposes, including transport services (e.g., transport of humans, delivery services, etc.). In examples described, the AV 500 can operate autonomously without human control. For example, the AV 500 can autonomously steer, accelerate, shift, brake, and operate lighting components. Some variations also recognize that the AV 500 can switch between an autonomous mode, in which the AV control system 520 autonomously operates the AV 500, and a manual mode in which a safety driver takes over manual control of the acceleration system 572, steering system 574, braking system 576, and lighting and auxiliary systems 578 (e.g., directional signals and headlights).

According to some examples, the control system 520 can utilize specific sensor resources in order to autonomously operate the AV 500 in a variety of driving environments and conditions. For example, the control system 520 can operate the AV 500 by autonomously operating the steering, acceleration, and braking systems 572, 574, 576 of the AV 500 to a specified destination. The control system 520 can perform vehicle control actions (e.g., braking, steering, accelerating) and route planning using sensor information, as well as other inputs (e.g., transmissions from remote or local human operators, network communication from other vehicles, etc.).

In an example of FIG. 5, the control system 520 includes computational resources (e.g., processing cores and/or field programmable gate arrays (FPGAs)) which operate to process sensor data received from a sensor suite 502 of the AV 500 that provides a sensor view of a road segment upon which the AV 500 operates. The sensor data can be processed to determine actions which are to be performed by the AV 500 in order for the AV 500 to continue on a route to the destination, or in accordance with a set of transport instructions received from a remote on-demand transport management service, in some variations, the control system 520 can include other functionality, such as wireless communication capabilities using a communications module 535, to send and/or receive wireless communications over one or more networks 585 with one or more remote sources. In controlling the AV 500, the control system 520 can generate commands to control the various control mechanisms 570 of the AV 500, including the vehicle's acceleration system 572, steering system 574, braking system 576, and auxiliary systems 578 (e.g., lights and directional signals).

The AV 500 can be equipped with multiple types of sensors 502 which can combine to provide a computerized perception, or sensor view, of the space and the physical environment surrounding the AV 500. Likewise, the control system 520 can operate within the AV 500 to receive sensor data from the sensor suite 502 and to control the various control mechanisms 570 in order to autonomously operate the AV 500, For example, the control system 520 can analyze the sensor data to generate low level commands executable by the acceleration system 572, steering system 574, and braking system 576 of the AV 500. Execution of the commands by the control mechanisms 570 can result in throttle inputs, braking inputs, and steering inputs that collectively cause the AV 500 to operate along sequential road segments according to a route plan.

In more detail, the sensor suite 502 operates to collectively obtain a live sensor view for the AV 500 (e.g., in a forward operational direction, or providing a 360 degree sensor view), and to further obtain situational information proximate to the AV 500, including any potential hazards or obstacles. By way of example, the sensors 502 can include multiple sets of camera systems 501 (video cameras, stereoscopic cameras or depth perception cameras, long range monocular cameras), LIDAR systems 503, one or more radar systems 505, and various other sensor resources such as sonar, proximity sensors, infrared sensors, and the like. According to examples described herein, the sensors 502 can be arranged or grouped in a sensor suite (e.g., in a sensor pod mounted to the roof of the AV 500) comprising any number of LIDAR, radar, monocular camera, stereoscopic camera, sonar, infrared, or other active or passive sensor systems.

Each of the sensors 502 can communicate with the control system 520 utilizing a corresponding sensor interface 510, 512, 514. Each of the sensor interfaces 510, 512, 514 can include, for example, hardware and/or other logical components which are coupled or otherwise provided with the respective sensor. For example, the sensors 502 can include a video camera and/or stereoscopic camera system 501 which can continually generate image data of the physical environment of the AV 500. The camera system 501 can provide the image data for the control system 520 via a camera system interface 510. Likewise, the LIDAR system 503, which can include one or more LIDAR modules described herein, can provide LIDAR data to the control system 520 via a LIDAR system interface 512. Furthermore, as provided herein, radar data from the radar system 505 of the AV 500 can be provided to the control system 520 via a radar system interface 514. In some examples, the sensor interfaces 510, 512, 514 can include dedicated processing resources, such as provided with field programmable gate arrays (FPGAs) which can, for example, receive and/or preprocess raw image data from the camera sensor.

In general, the sensor systems 502 collectively provide sensor data to a perception engine 540 of the control system 520. The perception engine 540 can access a database 530 comprising localization sub-maps of the given region in which the AV 500 operates. The localization sub-maps can comprise a series of road segment sub-maps corresponding to the autonomy grid 305 described with respect to FIG. 3A. As provided herein, the localization sub-maps can comprise highly detailed ground truth data of each road segment of the autonomy grid 305. For example, the localization sub-maps can comprise prerecorded and fused data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 500 travels along a given route, the perception engine 540 can access a current localization sub-map (CSM) of a current road segment to compare the details of the current localization sub-map with the sensor data in order to detect and classify any objects of interest, such as moving vehicles, pedestrians, bicyclists, and the like.

In various examples, the perception engine 540 can dynamically compare the live sensor data from the AV's sensor suite 502 to the current localization sub-map as the AV 500 travels through a corresponding road segment. The perception engine 540 can identify and classify any objects of interest in the live sensor data that can indicate a potential hazard. In accordance with many examples, the perception engine 540 can provide object of interest data (OOI Data) to a prediction engine 545 of the control system 520, where the objects of interest can each be classified (e.g., a pedestrian, a bicyclist, unknown objects, other vehicles, a static object, etc.).

Based on the classification of the detected objects, the prediction engine 545 can predict a path of each object of interest and determine whether the AV control system 520 should respond or react accordingly. For example, the prediction engine 545 can dynamically calculate a collision probability for each object of interest, and generate event alerts if the collision probability exceeds a certain threshold. As described herein, such event alerts can be processed by the vehicle control module 555 and/or the route planning engine 560, along with a processed sensor view (PSV) indicating the classified objects within the live sensor view of the AV 500. The vehicle control module 555 can then generate control commands executable by the various control mechanisms 570 of the AV 500, such as the AV's acceleration, steering, and braking systems 572, 574, 576. In certain examples, the route planning engine 560 can determine an immediate, low level trajectory and/or higher level plan for the AV 500 based on the event alerts and processed sensor view (e.g., for the next 100 meters or up to the next intersection).

On a higher level, the AV control system 520 can include a route planning engine 560 that provides the vehicle control module 555 with a route plan to a given destination, such as a pick-up location, a drop off location, or other destination within the given region. In various aspects, the route planning engine 560 can generate the route plan based on transport instructions received from a remote on-demand transportation management service (e.g., over the network 585).

In various examples, the control system 520 can implement a LIDAR calibration system 580, such as the LIDAR calibration system 100 described with respect to FIG. 1A. The LIDAR calibration system 580 can execute a calibration instruction set (e.g., stored in the database 530) that causes the LIDAR calibration system 580 to perform the intrinsic parameter calibration of each LIDAR module of the AV's LIDAR systems 503. In doing so, the LIDAR calibration system 580 can process the sensor data to correlate image and LIDAR data from fiducial targets and planar surfaces described herein, to determine any inaccuracies or variations in the intrinsic parameters of the LIDAR module. If such inaccuracies or variations are determined, the LIDAR calibration system can generate a set of calibration transforms to account for the variations. The LIDAR calibration system 580 may then transmit the calibration transforms to the perception engine 540 for implementation on the raw LIDAR data from the LIDAR module.

For the long-range laser scanners of the LIDAR module, the LIDAR calibration system 580 can communicate with the perception engine 540 to receive a sub-map trigger when the AV 500 arrives at a calibration location. In some aspects, the sub-map trigger can be appended to a particular localization sub-map stored in the database 530 (e.g., in metadata) to instruct the perception engine 540 to trigger the LIDAR calibration system 580 to perform the intrinsic parameter calibration of a given LIDAR module based on an external planar surface in the AV's driving environment. In variations, the sub-map trigger can be inserted or otherwise inputted in a typical mapping resource utilized by the AV 500 for navigation purposes.

The sub-map trigger can cause the LIDAR calibration system 580 to receive sensor data (e.g., image and LIDAR data) from the sensor suite 502. Initially, the LIDAR calibration system 580 can perform a calibration check to determine whether the LIDAR data from the planar surface is within tolerable ranges. For example, if the planar surface is completely flat, the point cloud from that surface should also generate a flat surface. A return signal for each laser scanner, corresponding to a point in the generated point cloud of the planar surface, can be analyzed to determine whether the return signal is within a tolerable range of the actual target. In variations, the LIDAR calibration system 580 can analyze the point cloud generated for the planar surface for any stray return signals outside the tolerable ranges. If a stray return signal is detected, then the LIDAR calibration system 580 can identify the culprit laser scanner, and generate a calibration transform to computationally compensate for the variation, thereby calibrating the culprit laser scanner's intrinsic parameters.

In some aspects, the LIDAR calibration system 580 can process image data to determine respective distances to features of the planar surface. For example, the nature of the planar surface can enable the LIDAR calibration system 580 to perform precision intrinsic parameter calibration of the LIDAR module (e.g., if the planar surface is a specially installed fiducial target having checkerboard features or other unique markers), or can enable the LIDAR calibration system 580 to perform a calibration check to verify that each point of the point cloud corresponding to the planar surface is within tolerable ranges in three-dimensional space (e.g., if the planar surface is a building façade or road sign). For full intrinsic calibration implementations, the LIDAR calibration system 580 can generate a set of calibration transforms that compensate for any variations. The calibration transforms may then be utilized by the perception engine 540 to generate a more robust pint cloud map from raw LIDAR data.

In certain examples, the LIDAR calibration system 580 can be remote to the AV 500. For such examples, the sensor data corresponding to the planar surface can be packaged in a data log set and transmitted to the remote LIDAR calibration system over the network 585. The remote LIDAR calibration system can generate the updated calibration transforms and transmit them to the AV 500 for implementation on raw LIDAR data.

Example Methods

Figure 6:
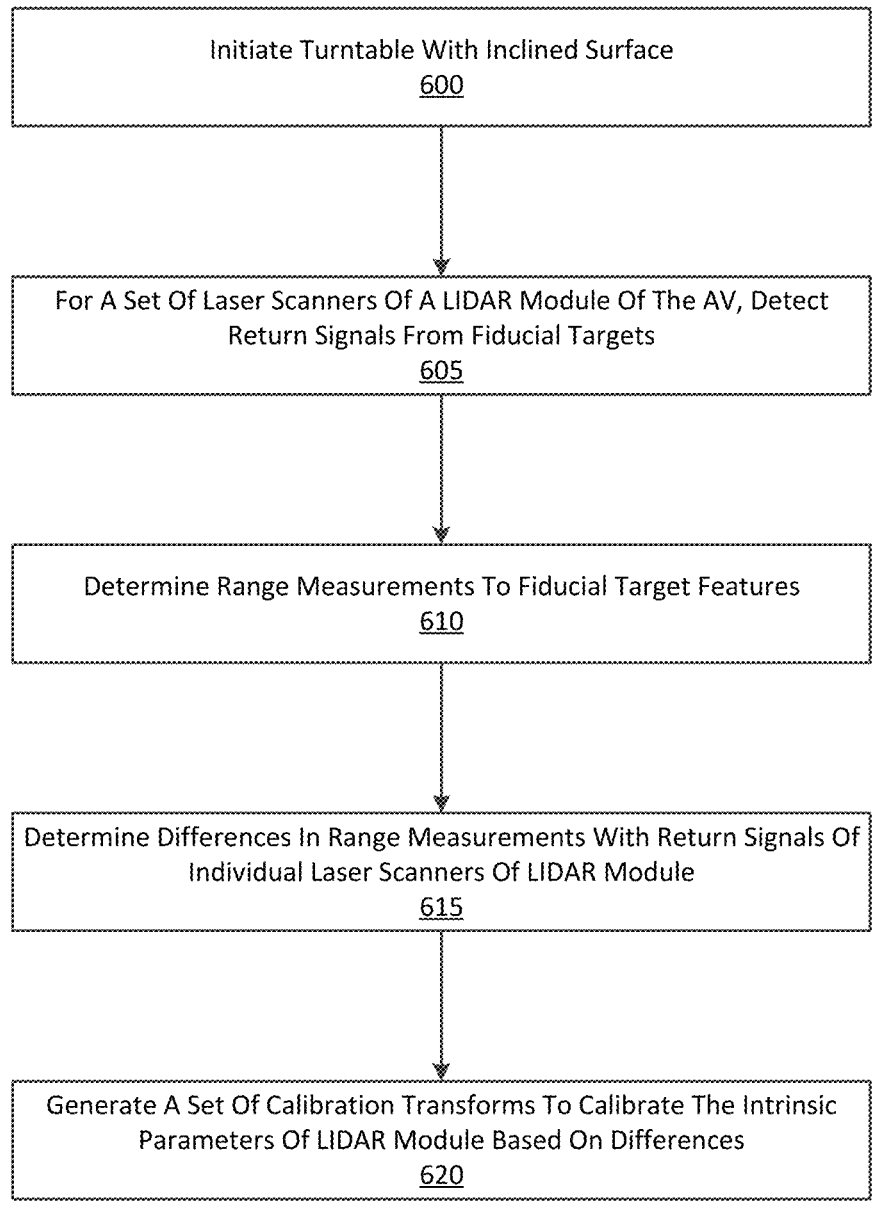
FIG. 6 is a flow chart describing an example method of implementing LIDAR calibration for an AV, according to example embodiments described herein.

FIG. 6 is a flow chart describing an example method of implementing intrinsic LIDAR calibration for an AV, according to examples described herein. In the below discussion of FIG. 6, reference may be made to reference characters representing like features as shown and described with respect to FIGS. 1A through 5. Furthermore, the processes described in connection with FIG. 6 may be performed by a LIDAR calibration system 100, either on-board the AV, or remote to the AV. Referring to FIG. 6, the LIDAR calibration system 100 can initiate a turntable having an inclined surface on which the AV is situated (600). The inclined surface can cause greater range and incident angle variation for the laser scanners, allowing for a more robust calibration process than with only a flat surface.

In various examples, the LIDAR calibration system 100 can detect return signals from fiducial targets for a set of laser scanners of a LIDAR module (605). In some examples, the AV can go through multiple rotations on the turntable. In further examples, the AV can be situated on an inclined surface, such as a ramp or actuatable surface while being rotated on the turntable (e.g., to increase range variation and angles of incidence of the laser scanners). The LIDAR calibration system 100 may then determine range measurements to unique features of the fiducial targets (610), such as checkerboard corners and other markers. The LIDAR calibration system 100 can then determine any differences between the range measurements and the return signals of individual laser scanners of the LIDAR module (615). Such differences and offsets can comprise the desired elevation angle, the offset angles, the scale, and/or timing of the laser scanner. Based on the differences, the LIDAR calibration system 100 can generate a set of calibration transforms to calibrate the intrinsic parameters of the LIDAR module to account for the differences (620).

Figure 7:
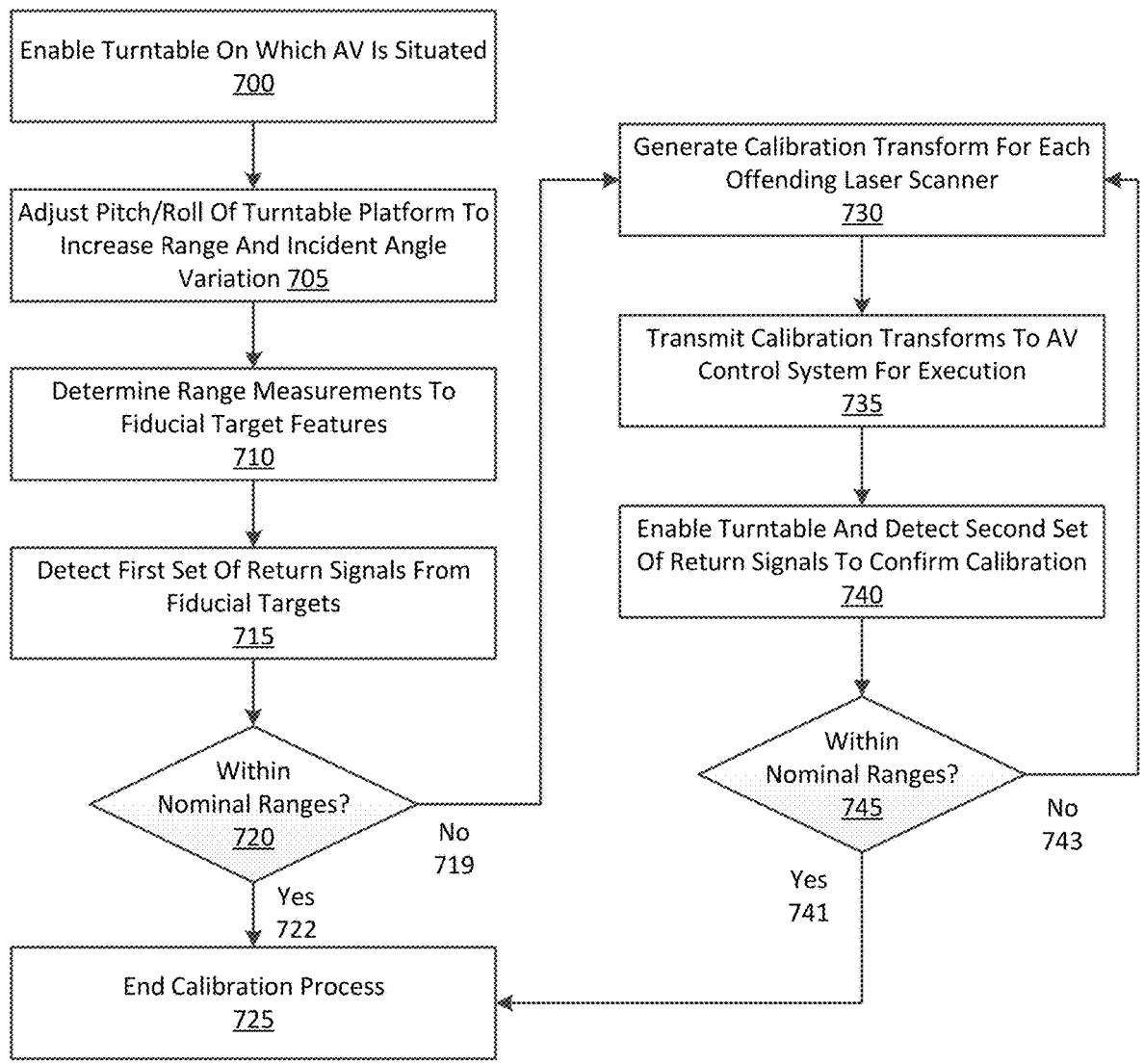
FIG. 7 is a flow chart describing an example method of implementing intrinsic LIDAR calibration for an AV, according to example embodiments described herein.

FIG. 7 is a flow chart describing an example method of implementing intrinsic LIDAR calibration for an AV, according to examples described herein. The below processes discussed with respect to FIG. 7 may be performed by an example LIDAR calibration system 100 operating on-board or remotely to an AV. Referring to FIG. 7, the LIDAR calibration system 100 can enable a turntable on which the AV is situated (700). In some aspects, the turntable can be actively initiated by the LIDAR calibration system 100. In variations, the AV can enable the turntable by driving onto the turntable surface and stopping at the proper location or markers for the calibration. For active control implementations, the LIDAR calibration system 100 can adjust a pitch and/or roll of the turntable platform to increase range and incident angle variation of the laser scanners (705). In various examples, the LIDAR calibration system 100 can also determine range measurements to fiducial target features (e.g., for each laser scanner of the LIDAR module) (710).

The LIDAR calibration system 100 can detect a first set of return signals from the fiducial targets (715). For remote implementations, the LIDAR calibration system 100 can detect the return signals by analyzing a data log set from the AV recorded while the turntable is initiated. In various examples, the LIDAR calibration system 100 can then determine whether the return signals, corresponding to a point cloud map of the fiducial targets, are within nominal ranges for the LIDAR module (720). As described herein, the nominal ranges can comprise minimal ranges for the intrinsic parameters of each laser scanner from an ideal and precise setup and orientation (e.g., as advertised by the manufacturer of the LIDAR module). If all the laser scanners of the LIDAR module are within nominal parameters (722), then the LIDAR calibration system 100 can end the calibration process (725).

However, if one or more of the laser scanners are outside the nominal parameters (719), the LIDAR calibration system 100 can generate one or more calibration transforms for each offending laser scanner to adapt for the intrinsic calibration variation (730). For remote implementations, the LIDAR calibration system 100 can transmit the updated calibration transforms to the AV for execution (735). In various examples, the LIDAR calibration system 100 can test or confirm the updated calibration transforms by enabling the turntable again and detecting a second set of return signals (740), and again determine whether the return signals are within the nominal ranges (745). If so (741), then the LIDAR calibration system 100 can end the calibration process (725). However, if not (743), then the LIDAR calibration system 100 can generate an updated set of calibration transforms for the offending laser scanners to adapt for the detected variations (730), and repeat the intrinsic calibration test.

Figure 8A:
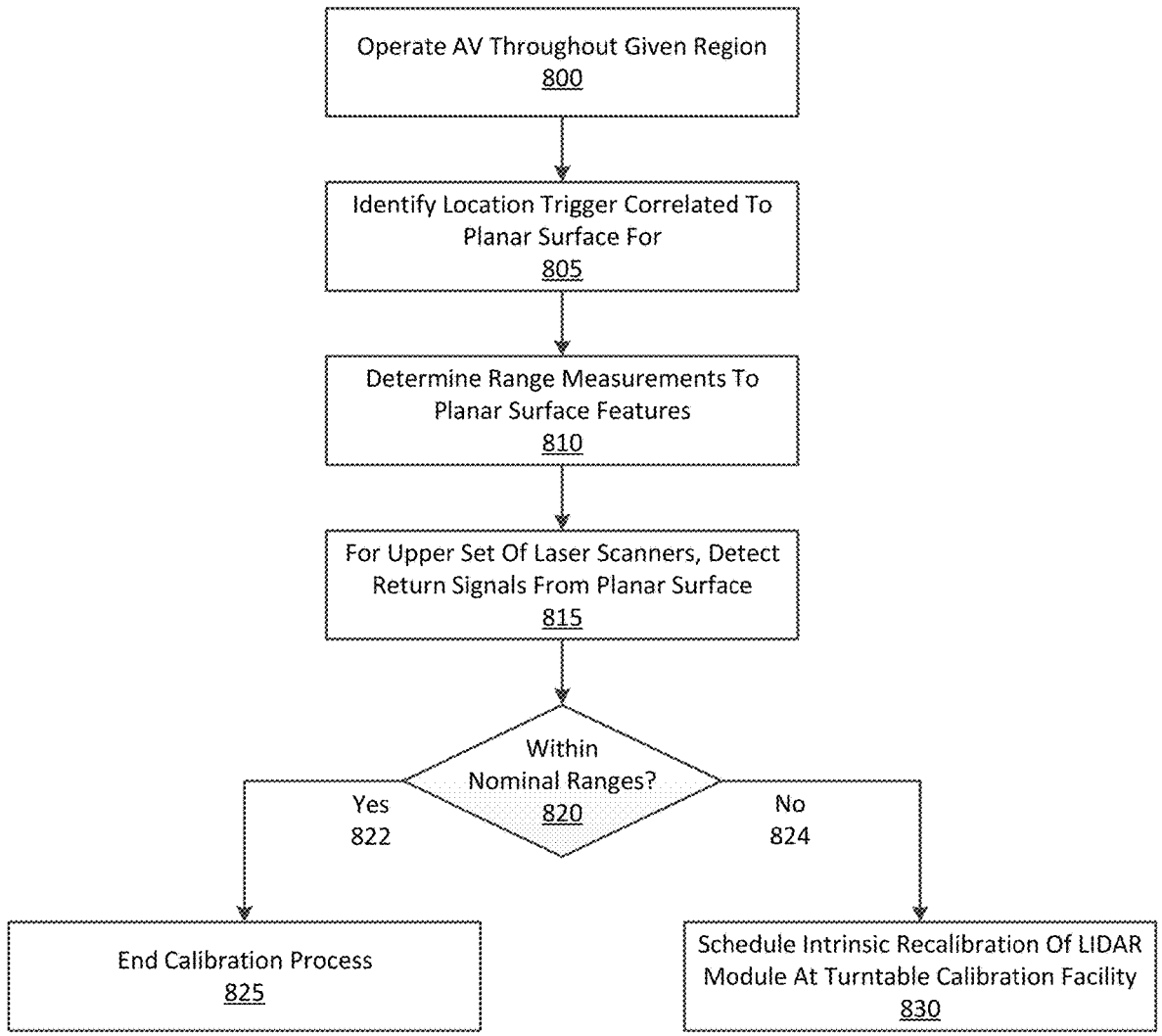
FIG. 8A is a flow chart describing an example method of performing a calibration check of the intrinsic parameters of a LIDAR module, according to example embodiments described herein.

FIG. 8A is a flow chart describing an example method of performing a calibration check of the intrinsic parameters of a LIDAR module, according to examples described herein. In certain implementations, the processes discussed below with respect to FIG. 8A may be performed by an AV implementing a LIDAR calibration system, or an AV control system that performs an intrinsic calibration check. Furthermore, the processes described with respect to FIG. 8A can be performed specifically for an upper set of laser scanners of the LIDAR module (e.g., those having an elevation angle greater than a threshold elevation angle). The contemplated advantages of such an arrangement involve the increased range possibilities of in-the-field calibration checks for the longer-range laser scanners, whereas the indoor intrinsic calibration is adequate for the closer-range laser scanners (e.g., the lower set having a negative elevation angle below the threshold elevation angle).

Referring to FIG. 8A, the AV can operate autonomously throughout a given region (800). In some aspects, the AV can perform on-demand transportation services by picking up and dropping off requesting passengers in normal operation. Additionally or alternatively, the AV can operate as a personal use vehicle of an owner, a delivery vehicle (e.g., an autonomous tractor trailer), or any specialized autonomous vehicle (e.g., an autonomous construction or farming vehicle, an autonomous boat, or autonomous aircraft). While operating throughout the given region, the AV can identify a location trigger correlated to a calibration planar surface (805). In some aspects, the location trigger can be imprinted or otherwise associated to a specific location as metadata in a corresponding localization sub-map stored on the AV. In variations, the location trigger can be identified as a calibration check feature on a road network map utilized by the AV for navigation. Other examples of calibration location triggers are contemplated, such as an encoded symbol on a road sign or road surface. As described herein, the location trigger can correspond to a targeted planar surface for performing an intrinsic calibration check and/or recalibrating the intrinsic parameters of the upper set of laser scanners.

According to various examples, the AV can determine range measurements to features of the planar surface (810). For example, the planar surface may be a building façade, which can include corner features that can be targeted by the AV for the calibration check. As another example, the planar surface may be a specialized calibration surface including fiducial features (e.g., a checkerboard pattern) that can be targeted by the AV for the calibration check. In some aspects, the range measurements may be known from a predetermined location at which the AV is to perform the calibration check. In variations, the AV can independently determine the range measurements using other sensors of the AV (e.g., a pair of cameras or a stereo-camera). In further variations, the AV may not determine range measurements to the planar surface or surface features, but rather analyze the point cloud corresponding to the planar surface for any return anomalies. These return anomalies can be indicative of misaligned or otherwise poorly calibrated laser scanners.

For the upper set of laser scanners, the AV can detect return signals from the planar surface (815). The AV may then determine whether the return signals are within nominal ranges, or whether any intrinsic parameters of individual laser scanners require recalibration (820). If the laser scanners are within the nominal parameters (822), then the AV can end the calibration check and continue (825). However, if one or more of the laser scanners are not within the nominal parameters (824), then the AV can schedule a recalibration of the intrinsic parameters of the upper set of laser scanners at a turntable calibration facility (830). In variations, the AV can transmit a data log set corresponding to the planar surface to a remote LIDAR calibration system 100, which can analyze the LIDAR data, identify the aberrant laser scanners, generate calibration transforms to account for the variations, and transmit the updated calibration transforms to the AV for execution. In further variations, the AV can analyze the return signals from the planar surface, and generate the set of calibration transforms independently.

Figure 8B:
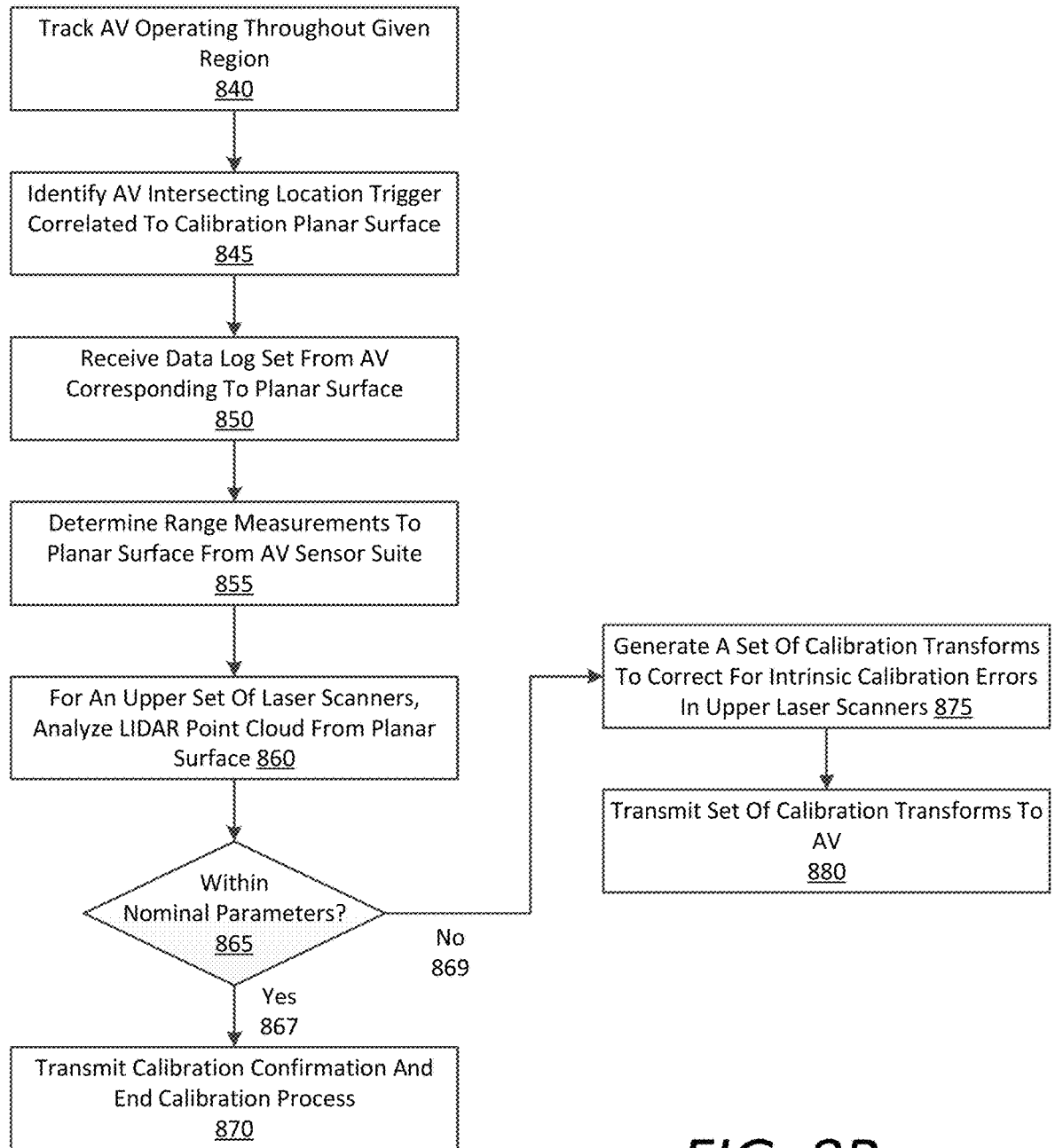
FIG. 8B is a flow chart describing an example method of calibrating the intrinsic parameters of a LIDAR module, according to example embodiments described herein.

FIG. 8B is a flow chart describing an example method of calibrating the intrinsic parameters of a LIDAR module, according to examples described herein. The below processes described with respect to FIG. 8B may be performed by an example LIDAR calibration system 100 implemented remotely to an AV operating throughout a given region. Referring to FIG. 8B, the LIDAR calibration system 100 can track an AV operating throughout a given region (840). In various implementations, the LIDAR calibration system 100 can track multiple AVs, or an entire fleet of AVs operating throughout the given region. The LIDAR calibration system 100 can identify an AV intersecting with a location trigger that is correlated to calibration planar surface (845). The LIDAR calibration system 100 may then receive a data log set from the AV comprising sensor data indicating the planar surface (850). The LIDAR calibration system 100 can determine range measurements to the planar surface from the AV sensor suite (855).

In various examples, the LIDAR calibration system 100 can analyze the LIDAR point cloud corresponding to the planar surface and generated from the upper set of laser scanners of the AV's LIDAR module (860). The LIDAR calibration system 100 may then determine whether each return signal in the point cloud is within a set of nominal parameters (865). If so (867), then the LIDAR calibration system 100 can transmit a calibration confirmation to the AV and end the calibration process (870). However, if not (869), then the LIDAR calibration system 100 can generate a set of calibration transforms to adjust for the intrinsic calibration variations in the upper set of laser scanners (875). The LIDAR calibration system 100 may then transmit the set of calibration transforms to the AV (880).

Hardware Diagrams

Figure 9:
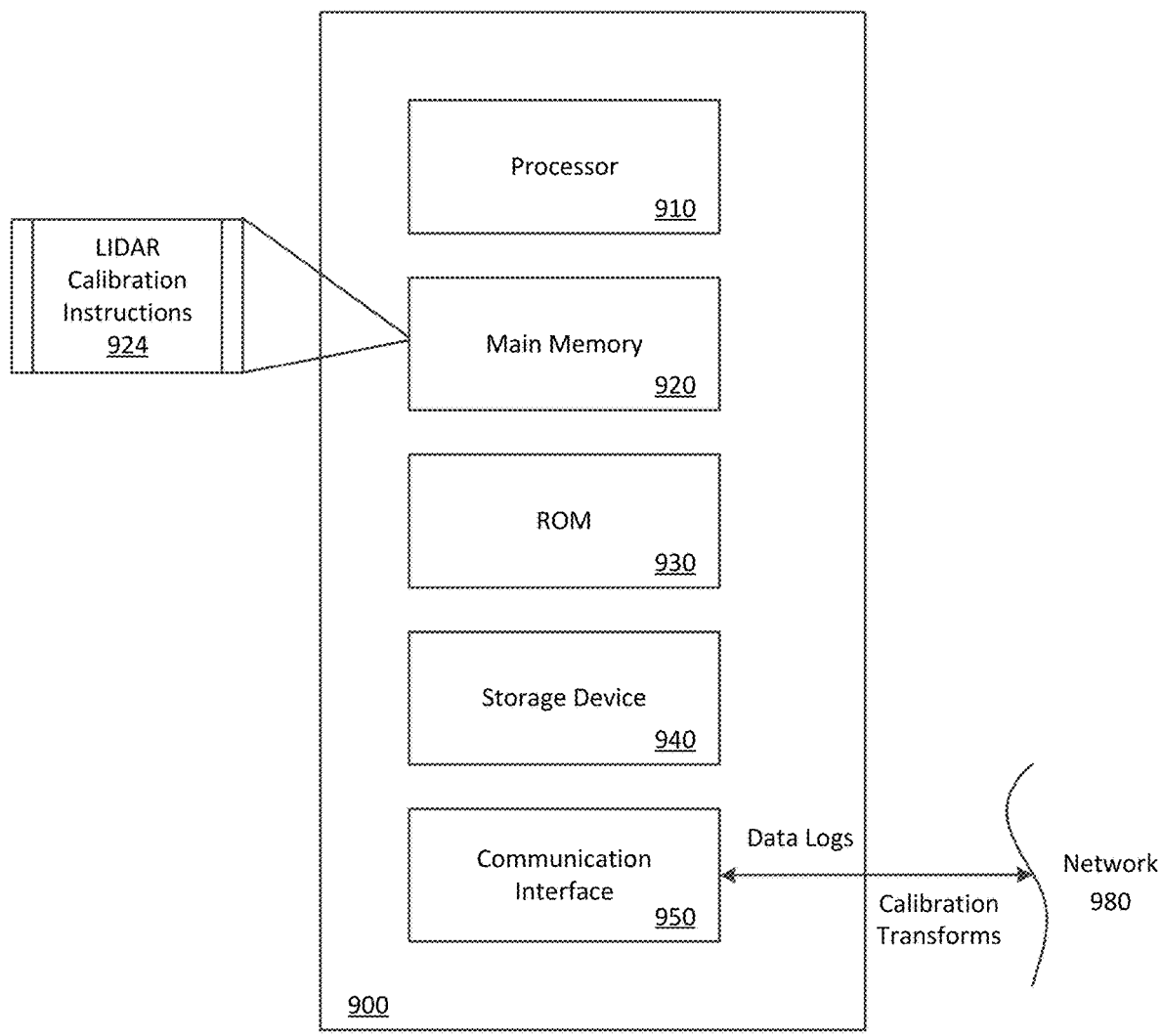
FIG. 9 is a block diagram illustrating a computer system upon which example embodiments described herein may be implemented.

FIG. 9 is a block diagram that illustrates a computer system upon which examples described herein may be implemented. A computer system 900 can be implemented on, for example, a server or combination of servers. For example, the computer system 900 may be implemented as part of a network service for providing transportation services. In the context of FIG. 1, the vehicle sensor calibration system 100 may be implemented using a computer system 900 such as described by FIG. 9. The LIDAR calibration system 100 may also be implemented using a combination of multiple computer systems as described in connection with FIG. 9.

In one implementation, the computer system 900 includes processing resources 910, a main memory 920, a read-only memory (ROM) 930, a storage device 940, and a communication interface 950. The computer system 900 includes at least one processor 910 for processing information stored in the main memory 920, such as provided by a random access memory (RAM) or other dynamic storage device, for storing information and instructions which are executable by the processor 910. The main memory 920 also may be used for storing temporary variables or other intermediate information during execution of instructions to be executed by the processor 910. The computer system 900 may also include the ROM 930 or other static storage device for storing static information and instructions for the processor 910. A storage device 940, such as a magnetic disk or optical disk, is provided for storing information and instructions.

The communication interface 950 enables the computer system 900 to communicate with one or more networks 980 (e.g., cellular network) through use of the network link (wireless or wired). Using the network link, the computer system 900 can communicate with one or more computing devices, one or more servers or an AV. In accordance with examples, the computer system 900 can receive a data log corresponding to the AV being run through a pre-planned sequence of motions (e.g., rotating on a turntable having an inclined surface or actuated platform) that expose the sensors of the AV to a number of positioned fiducial markers. The executable instructions stored in the memory 920 can include LIDAR calibration instructions 924, which the processor 910 can execute to analyze the sensor data in the data log for calibration. Execution of the LIDAR calibration instructions 924 can comprise running the sensor data in the data log through individual mathematical models for each sensor type (e.g., LIDAR or camera), or for each individual sensor of each sensor type (e.g., main LIDAR, rear left corner stereo-camera, etc.). The configuration results for each data set corresponding to each sensor can be analyzed by the processor 910 to generate a set of calibration transforms that calibrate the intrinsic parameters of a given LIDAR module of the AV.

The processor 910 is configured with software and/or other logic to perform one or more processes, steps and other functions described with implementations, such as described in connection with FIGS. 1 through 8B, and elsewhere in the present application.

Figure 10:
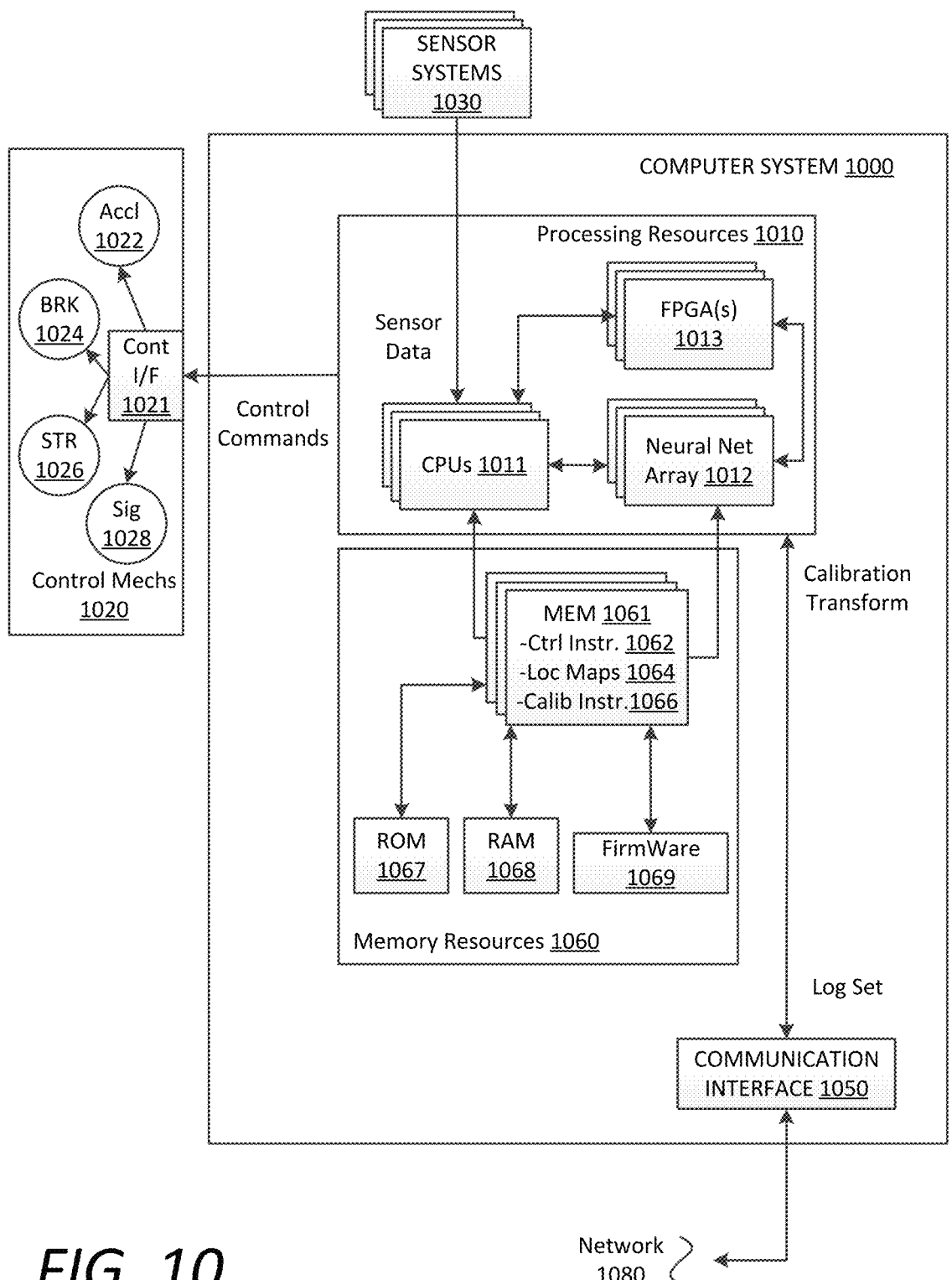
FIG. 10 is a block diagram illustrating a computing system for an AV upon which example embodiments described herein may be implemented.

FIG. 10 is a block diagram illustrating a computer system upon which example AV processing systems described herein may be implemented. The computer system 1000 can be implemented using a number of processing resources 1010, which can comprise computer processing units (CPUs) 1011 and field programmable gate arrays (FPGAs) 1013. In some aspects, any number of processors 1011 and/or FPGAs 1013 of the computer system 1000 can be utilized as components of a neural network array 1012 implementing a machine learning model and utilizing road network maps stored in memory 1061 of the computer system 1000. In the context of FIG. 5, various aspects and components of the AV control system 520 can be implemented using one or more components of the computer system 1000 shown in FIG. 10.

According to some examples, the computer system 1000 may be implemented within an AV with software and hardware resources such as described with examples of FIG. 5. In an example shown, the computer system 1000 can be distributed spatially into various regions of the AV, with various aspects integrated with other components of the AV itself. For example, the processing resources 1010 and/or memory resources 1060 can be provided in a cargo space of the AV. The various processing resources 1010 of the computer system 1000 can also execute control instructions 1062 using microprocessors 1011, FPGAs 1013, a neural network array 1012, or any combination of the foregoing.

In an example of FIG. 10, the computer system 1000 can include a communication interface 1050 that can enable communications over a network 1080. In one implementation, the communication interface 1050 can also provide a data bus or other local links to electro-mechanical interfaces of the vehicle, such as wireless or wired links to and from control mechanisms 1020 (e.g., via a control interface 1021), sensor systems 1030, and can further provide a network link to a backend transport management system or a remote teleassistance system (implemented on one or more datacenters) over one or more networks 1080.

The memory resources 1060 can include, for example, main memory 1061, a read-only memory (ROM) 1067, storage device, and cache resources. The main memory 1061 of memory resources 1060 can include random access memory (RAM) 1068 or other dynamic storage device, for storing information and instructions which are executable by the processing resources 1010 of the computer system 1000. The processing resources 1010 can execute instructions for processing information stored with the main memory 1061 of the memory resources 1060. The main memory 1061 can also store temporary variables or other intermediate information which can be used during execution of instructions by the processing resources 1010. The memory resources 1060 can also include ROM 1067 or other static storage device for storing static information and instructions for the processing resources 1010. The memory resources 1060 can also include other forms of memory devices and components, such as a magnetic disk or optical disk, for purpose of storing information and instructions for use by the processing resources 1010. The computer system 1000 can further be implemented using any combination of volatile and/or non-volatile memory, such as flash memory, PROM, EPROM, EEPROM (e.g., storing firmware 1069), DRAM, cache resources, hard disk drives, and/or solid state drives.

The memory 1061 may also store localization maps 1064 in which the processing resources 1010—executing control instructions 1062—continuously compare to sensor data 1032 from the various sensor systems 1030 of the AV. Execution of the control instructions 1062 can cause the processing resources 1010 to generate control commands in order to autonomously operate the AV's acceleration 1022, braking 1024, steering 1026, and signaling systems 1028 (collectively, the control mechanisms 1020). Thus, in executing the control instructions 1062, the processing resources 1010 can receive sensor data from the sensor systems 1030, dynamically compare the sensor data 1032 to a current localization map 1064, and generate control commands for operative control over the acceleration, steering, and braking of the AV along a particular route plan. The processing resources 1010 may then transmit the control commands to one or more control interfaces 1021 of the control mechanisms 1020 to autonomously operate the AV along an autonomy route.

The computer system 1000 can transmit a data log set comprising sensor data of fiducial targets and planar surfaces, as described herein, to a remote LIDAR calibration system over the network 1080. The LIDAR calibration system can generate a set of calibration transforms based on the log set that account for any variations in the intrinsic parameters of the LIDAR module. The calibration transforms may then be executed by the processing resources to generate a more robust and accurate point cloud map. In certain variations, the memory can further store calibration instructions 1066 that can be executed by the processing resources 1010 to recalibrate the LIDAR module. For example, the calibration instructions 1066 can be executable to cause the computer system 1000 to analyze LIDAR data from the LIDAR module based on a set of fiducial targets, planar surfaces, and/or correlated image data to specific features of the fiducial targets and planar surfaces. The computer system 1000 can determine whether the intrinsic parameters of any individual laser scanners are to be compensated for, and if so, generate an updated calibration transform to compensate for the variation(s) in the laser scanner's intrinsic parameters.

While examples of FIGS. 9 and 10 provide for computing systems for implementing aspects described, some or all of the functionality described with respect to one computing system of FIGS. 9 and 10 may be performed by other computing systems described with respect to FIGS. 9 and 10.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A light-detection and ranging (LIDAR) calibration system for an autonomous vehicle, the LIDAR calibration system comprising:
one or more processors; and
one or more memory resources storing instructions that, when executed by the one or more processors, cause the LIDAR calibration system to:
for a set of laser scanners of a LIDAR module, detect a set of return signals from a plurality of fiducial targets, wherein the autonomous vehicle rests on an inclined platform of a rotating turntable to detect the set of return signals, wherein the inclined platform is placed on the rotating turntable and is inclined relative to the rotating turntable; and
based on the set of return signals, generate a set of calibration transforms to adjust a set of intrinsic parameters of the LIDAR module.

2. The LIDAR calibration system of claim 1, wherein the LIDAR calibration system is included on-board the autonomous vehicle.

3. The LIDAR calibration system of claim 1, wherein the LIDAR calibration system is remote to the autonomous vehicle, and wherein the executed instructions further cause the LIDAR calibration system to:
receive; from the autonomous vehicle over one or more networks; a log set comprising LIDAR data that includes the set of return signals from the LIDAR module.

4. The LIDAR calibration system of claim 1, wherein the inclined platform comprises a fixed angle incline on the rotating turntable.

5. The LIDAR calibration system of claim 1, wherein the inclined platform comprises one or more actuators that controls at least one incline angle of the inclined platform.

6. The LIDAR calibration system of claim 5, wherein the executed instructions further cause the LIDAR calibration system to:
adjust the at least one incline angle of the inclined platform to increase range variation in the set of return signals.

7. The LIDAR calibration system of claim 6, wherein the at least one incline angle comprises a roll angle and a pitch angle.

8. The LIDAR calibration system of claim 1, wherein the set of intrinsic parameters of the LIDAR module comprises a plurality of offset angles for each laser scanner of the LIDAR module.

9. The LIDAR calibration system of claim 1, wherein the executed instructions cause the LIDAR calibration system to determine range measurements of the plurality of fiducial targets based on image data from at least one camera of the autonomous vehicle.

10. The LIDAR calibration system of claim 1, wherein the set of laser scanners comprises a lower set of laser scanners each having a negative incidence angle.

11. A non-transitory computer-readable medium storing instructions that, when executed by one or more processors, cause the one or more processors to:
for a set of laser scanners of a LIDAR module of an autonomous vehicle, detect a set of return signals from a plurality of fiducial targets, wherein the autonomous vehicle rests on an inclined platform of a rotating turntable to detect the set of return signals, wherein the inclined platform is placed on the rotating turntable and is inclined relative to the rotating turntable, and wherein data collection parameters comprising at least one incline angle associated with the inclined platform are stored in the non-transitory computer-readable medium; and
based on the set of return signals and the data collection parameters, generate a set of calibration transforms to adjust a set of intrinsic parameters of the LIDAR module.

12. The non-transitory computer-readable medium of claim 11, wherein the data collection parameters are processed by one or more processors that are included on-board the autonomous vehicle.

13. The non-transitory computer-readable medium of claim 11, wherein the data collection parameters are processed by one or more processors that are remote to the autonomous vehicle, and wherein the executed instructions further cause the one or more processors to:
receive, from the autonomous vehicle over one or more networks, a log set comprising LIDAR data that includes the set of return signals from the LIDAR module.

14. The non-transitory computer-readable medium of claim 11, wherein the at least one incline angle comprises a fixed angle incline on the rotating turntable.

15. The non-transitory computer-readable medium of claim 11, wherein the at least one incline angle is adjustable by one or more actuators.

16. The non-transitory computer-readable medium of claim 15, wherein the executed instructions further cause the one or more processors to:
adjust the at least one incline angle of the inclined platform to increase range variation in the set of return signals.

17. The non-transitory computer-readable medium of claim 16, wherein the at least one incline angle comprises a roll angle and a pitch angle.

18. The non-transitory computer-readable medium of claim 11, wherein the set of intrinsic parameters of the LIDAR module comprises a plurality of offset angles for each laser scanner of the LIDAR module.

19. The non-transitory computer-readable medium of claim 11, wherein the executed instructions cause the one or more processors to determine range measurements of the plurality of fiducial targets based on image data from at least one camera of the autonomous vehicle.

20. A computer-implemented method of calibrating intrinsic parameters of a LIDAR module of an autonomous vehicle, the method comprising:
for a set of laser scanners of the LIDAR module, detecting a set of return signals from a plurality of fiducial targets, wherein the autonomous vehicle rests on an inclined platform of a rotating turntable to detect the set of return signals, wherein the inclined platform is placed on the rotating turntable and is inclined relative to the rotating turntable; and
based on the set of return signals, generating a set of calibration transforms to adjust a set of intrinsic parameters of the LIDAR module.

* * * * *